US011625893B2

United States Patent
Ton-That et al.

(10) Patent No.: US 11,625,893 B2
(45) Date of Patent: Apr. 11, 2023

(54) SYSTEMS AND METHODS FOR ARTIFICIAL INTELLIGENCE (AI) THREE-DIMENSIONAL MODELING

(71) Applicant: The Travelers Indemnity Company, Hartford, CT (US)

(72) Inventors: Hoa Ton-That, Glastonbury, CT (US); Ryan M. Scanlon, East Hampton, CT (US); Douglas L. Roy, Plantsville, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

(21) Appl. No.: 17/353,008

(22) Filed: Jun. 21, 2021

(65) Prior Publication Data
US 2022/0406007 A1 Dec. 22, 2022

(51) Int. Cl.
| | |
|---|---|
| *G06T 17/00* | (2006.01) |
| *G06N 20/00* | (2019.01) |
| *G06N 5/04* | (2006.01) |
| *G06T 7/13* | (2017.01) |
| *G06T 7/73* | (2017.01) |
| *G06K 9/62* | (2022.01) |
| *G06T 3/00* | (2006.01) |
| *G06T 7/60* | (2017.01) |
| *G06T 7/12* | (2017.01) |
| *H04N 5/232* | (2006.01) |

(52) U.S. Cl.
CPC .............. *G06T 17/00* (2013.01); *G06K 9/627* (2013.01); *G06N 5/04* (2013.01); *G06N 20/00* (2019.01); *G06T 3/00* (2013.01); *G06T 7/12* (2017.01); *G06T 7/13* (2017.01); *G06T 7/60* (2013.01); *G06T 7/73* (2017.01); *G06T 2207/30244* (2013.01); *H04N 5/23238* (2013.01)

(58) Field of Classification Search
CPC ............ G06T 17/00; G06T 3/00; G06T 7/12; G06T 7/13; G06T 7/60; G06T 7/73; G06T 2207/30244; G06K 9/627; G06N 5/04; G06N 20/00; H04N 5/23238
See application file for complete search history.

(56) References Cited

U.S. PATENT DOCUMENTS

| | | | |
|---|---|---|---|
| 10,825,247 B1* | 11/2020 | Vincent | G06T 17/05 |
| 11,151,655 B1 | 10/2021 | Spader et al. | |
| 11,252,329 B1* | 2/2022 | Cier | G06V 10/454 |
| 2015/0227645 A1* | 8/2015 | Childs | G06F 30/13 703/1 |
| 2020/0357132 A1* | 11/2020 | Jovanovic | H04N 5/232933 |

(Continued)

OTHER PUBLICATIONS

Website: https://www.xactware.com/en-us/; Verisk Elevate The Peak of Insurance Innovation. Salt Lake City, Feb. 15-16, 2022. Download date: Oct. 28, 2021. 2 pps.

(Continued)

*Primary Examiner* — Frank S Chen
(74) *Attorney, Agent, or Firm* — RowanTree Law Group, PLLC; Carson C. K. Fincham

(57) ABSTRACT

An Artificial Intelligence (AI) three-dimensional modeling system that analyzes and segments imagery of a room, generates a three-dimensional model of the room from the segmented imagery, identifies objects within the room, and conducts an assessment of the room based on the identified objects.

20 Claims, 11 Drawing Sheets

(56) References Cited

U.S. PATENT DOCUMENTS

| | | | |
|---|---|---|---|
| 2021/0064216 A1* | 3/2021 | Li | G06T 11/00 |
| 2021/0110137 A1* | 4/2021 | Kerzner | G06V 20/10 |
| 2022/0189122 A1* | 6/2022 | Li | G06T 19/003 |
| 2022/0224833 A1* | 7/2022 | Cier | H04N 5/23238 |

OTHER PUBLICATIONS

Website: https://www.locometric.com/roomscan; RoomScan Pro Always gets the job done; download date: Oct. 28, 2021; 4 pps.

Website: https://meshroom-manual.readthedocs.io/en/latest/; download date: Oct. 28, 2021; 1 pps.

Website: https://developers.google.com/ar; download date Dec. 9, 2021; 3 pps.

* cited by examiner

SYSTEMS AND METHODS FOR ARTIFICIAL INTELLIGENCE (AI) THREE-DIMENSIONAL MODELING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Various types of assessments are based on layouts or contents of structures. Room sizes, furnishings, wall or floor covering materials, finishes, etc., may be utilized, for example, to evaluate or estimate variable values for a variety of purposes, such as construction or maintenance estimations, insurance coverage or claims evaluations, appraisal processes, or safety inspections (e.g., municipal inspections). Manual measurement processes have largely been replaced by advancing technologies, such as Light Detection and Ranging (LiDAR), mobile photogrammetry, or Augmented Reality (AR) programs. Each of these options provides certain benefits but is also subject to various deficiencies. While LiDAR and mobile photogrammetry offer precise results, for example, the hardware and software required for such solutions remains expensive and requires significant training to properly employ. AR programs, which may be available for execution on consumer electronic devices, such as smart phones, offer a lower cost and more easily operated solution, but provide limited precision while consuming large amounts of data storage, processing power, or network bandwidth.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Figure 1:
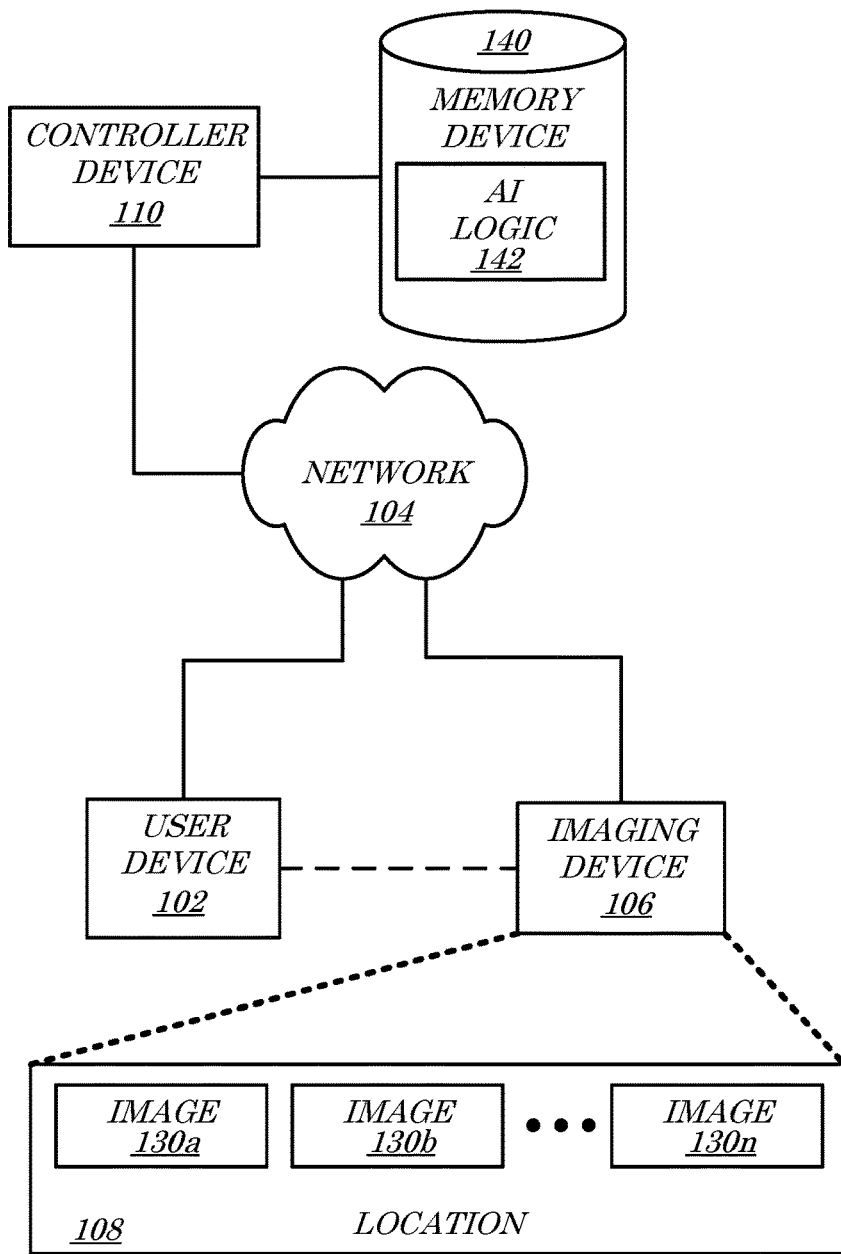
FIG. 1 is a block diagram of a system according to some embodiments.

Existing computerized systems for evaluating structural spaces (e.g., rooms of a building) either require expensive and complicated specialized hardware (e.g., LiDAR equipment, stereo camera, and/or 3-D cameras) or provide inaccurate estimations. Each of these existing methods also requires significant memory storage, intensive data processing power, and/or high networking bandwidth.

In accordance with embodiments herein, these and other deficiencies of existing systems are remedied by providing systems, apparatus, methods, and articles of manufacture for Artificial Intelligence (AI) three-dimensional modeling that analyze and segment imagery of a room, generate a three-dimensional model of the room from the segmented imagery, identify objects within the room, and/or conduct an assessment of the room based on the identified objects. In some embodiments, for example, three-dimensional modeling may comprise (i) acquiring a plurality of images (and/or a panoramic image) of a location, (ii) identifying (e.g., utilizing AI image processing logic) corners in the image(s), (iii) identifying (e.g., utilizing AI image processing logic) a camera location (e.g., from which the image(s) were acquired), (iv) identifying (e.g., utilizing AI image processing logic) walls (e.g., boundaries of the location) from the image(s), (v) cutting (e.g., utilizing AI image processing logic) the walls from the image(s), (vi) normalizing (e.g., utilizing AI image processing logic) the walls, (vii) defining an array of coordinates bounding and/or describing the location, (viii) projecting the image(s) into a 3-D environment, (ix) identifying a plurality of objects at the location, (x) classifying each object, (xi) identifying a rule for each object (e.g., based on the classification), (xii) determining whether to acquire a measurement related to the object(s), (xiii) identifying a measurement (e.g., if required) related to one or more of the objects, (xiv) determining whether the rule has been met, (xv) recording a deviation (e.g., in the case that a rule is not met), (xvi) calculating an assessment, (xvii) determining whether additional rules need to be evaluated, (xviii) determining whether more objects need to be evaluated, and/or (xix) outputting the assessment (and/or an indication thereof).

In accordance with some embodiments, the application of AI three-dimensional modeling as described herein may provide a reduction in computer processing resources, a reduction in necessary memory storage requirements, and other technical improvements. The particular AI three-dimensional modeling systems and methods described herein may, for example, permit available processing and memory resources to be utilized to achieve accurate structural area and/or location assessments without requiring complicated hardware, large capital outlays, and/or specialized training. According to some embodiments, an untrained end user may be guided through the data acquisition process through a remote telepresence session and/or AI-driven prompts. In such a manner, for example, specialized personnel and equipment may no longer be necessary to conduct structural area and/or location assessments, greatly reducing costs, reducing the amount of time required to conduct an assessment, and/or reducing bandwidth constraints in electronic networks.

II. AI Three-Dimensional Modeling Systems

Referring first to FIG. 1, a block diagram of a system 100 according to some embodiments is shown. In some embodiments, the system 100 may comprise a user device 102 communicatively coupled to a network 104. In some embodiments, the user device 102 and/or the network 104 may also or alternatively be coupled to a sensor, such as an imaging device 106, that is disposed to capture data descriptive of a location 108. According to some embodiments, the user device 102 and/or the imaging device 106 may be in communication with (e.g., via the network 104) a controller device 110. In some embodiments, the imaging device 106 may capture and/or acquire data descriptive of one or more objects 130*a-n* at the location 108 and/or may provide indications of the data to one or more of the user device 102 and the controller device 110. According to some embodiments, the controller device 110, the user device 102, and/or the imaging device 106 may be in communication with (e.g., via the network 104) a memory device 140 (e.g., storing AI logic 142). In accordance with various embodiments herein, the user device 102 may be utilized to direct, manage, and/or interface with the imaging device 106 to capture imagery (and/or other sensor data) of the location 108 and/or the one or more objects 130*a-n* thereof. In some embodiments, the captured imagery/data may be provided from the imaging device 106 to the user device 102 (and/or the controller device 110) for imagery/sensor data analysis and execution of stored analysis rules and/or logic (e.g., the AI logic 142). In such a manner, for example, data descriptive of the objects 130*a-n* may be input into the system 100 and utilized to compute analytic metrics (e.g., an assessment) for the location 108 and/or the one or more objects 130*a-n*, such as an indication of a monetary value, risk level, and/or a determination (e.g., an underwriting and/or claim outcome determination).

Fewer or more components 102, 104, 106, 108, 110, 130*a-n*, 140, 142 and/or various configurations of the depicted components 102, 104, 106, 108, 110, 130*a-n*, 140, 142 may be included in the system 100 without deviating from the scope of embodiments described herein. In some embodiments, the components 102, 104, 106, 108, 110, 130*a-n*, 140, 142 may be similar in configuration and/or functionality to similarly named and/or numbered components as described herein. In some embodiments, the system 100 (and/or portions thereof) may comprise an automatic AI three-dimensional modeling program, system, and/or platform programmed and/or otherwise configured to execute, conduct, and/or facilitate the methods/processes 400, 600 of FIG. 4 and/or FIG. 6 herein, and/or portions or combinations thereof.

The user device 102, in some embodiments, may comprise any type or configuration of computing, mobile electronic, network, user, and/or communication device that is or becomes known or practicable. The user device 102 may, for example, comprise one or more tablet computers, such as an iPad® manufactured by Apple®, Inc. of Cupertino, Calif., and/or cellular and/or wireless telephones or "smart" phones, such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, the user device 102 may comprise one or more devices owned and/or operated by one or more users, such as a homeowner, risk manager, underwriter, community association staff, realtor, contractor, etc. According to some embodiments, the user device 102 may communicate with the controller device 110 via the network 104 to provide imagery and/or other data captured by the imaging device 106 for analysis and/or assessment of the location 108, as described herein. According to some embodiments, the user device 102 may store and/or execute specially programmed instructions (such as a mobile device application) to operate in accordance with embodiments described herein. The user device 102 may, for example, execute one or more mobile device programs that activate and/or control the imaging device 106 and/or that analyze imagery and/or other data of the location 108 and/or the objects 130*a-n*, e.g., to identify one or more of the objects 130*a-n*, identify one or more rules associated with the objects 130*a-n*, evaluate the one or more rules, and/or compute an assessment based on the evaluation of the rules.

The network 104 may, according to some embodiments, comprise a Local Area Network (LAN; wireless and/or wired), cellular telephone, Bluetooth® and/or Bluetooth Low Energy (BLE), Near Field Communication (NFC), and/or Radio Frequency (RF) network with communication links between the controller device 110, the user device 102, the imaging device 106, and/or the memory device 140. In some embodiments, the network 104 may comprise direct communications links between any or all of the components 102, 106, 110, 140 of the system 100. The user device 102 may, for example, be directly interfaced or connected to one or more of the imaging device 106 and/or the controller device 110 via one or more wires, cables, wireless links, and/or other network components, such network components (e.g., communication links) comprising portions of the network 104. In some embodiments, the network 104 may comprise one or many other links or network components other than those depicted in FIG. 1. The user device 102 and/or the imaging device 106 may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102, 106, 110, 140 of the system 100. The network 104 may comprise one or more cellular telephone networks with communication links between the user device 102, the imaging device 106, and the controller device 110, for example, and/or may comprise a BLE, NFC, RF, and/or "personal" network comprising short-range wireless communications between the user device 102 and the imaging device 106, for example.

The imaging device 106, in some embodiments, may comprise any type or configuration of device, vehicle, sensor, and/or object that is capable of capturing imagery and/or other data descriptive of the location 108 and/or the objects 130*a-n* thereof. The imaging device 106 may comprise, for example, a camera coupled to and/or integral with the user device 102, such as the Pro 12 MP or Dual 12 MP camera available on the iPhone® 12 Pro or iPhone® 12, respectively. In some embodiments, the imagery device 106 may comprise a stand-alone device (e.g., separate from the user device 102), such as an iXM-RS150F/iXM-RS100F full frame ultra-high resolution aerial camera capable of capturing three or four band imagery data (e.g., RGB plus Near IR) at an image resolution of 14204×10625 pixels, available from PhaseOne Industrial of Frederiksberg, Denmark. The imagery and/or other data captured by the imaging device 106 may generally comprise any type, quantity, and/or format of photographic, video, and/or other sensor data descriptive of the location 108 and/or the objects 130*a-n* thereof. According to some embodiments, the data captured and/or acquired by the imaging device 106 may comprise one or more images descriptive of a three hundred and sixty-degree (360°) field of view at the location 108, such as a plurality of individual images taken at different bearings from a given position and/or a single panoramic image taken from the given position. In some embodiments, the imaging device 106 may also or alternatively comprise a server and/or datastore that is configured to provide the imagery and/or other data descriptive of the location 108 and/or the objects 130*a-n*. The imaging device 106 may comprise, for example, a third-party and/or vendor device configured to supply imagery and/or other sensor data acquired from various cameras, sensors, and/or other sources.

According to some embodiments, the location 108 may comprise any location desired for analysis and/or assessment, such as a location of an insured object/structure, a location of a customer, a location of an account and/or business, etc. In some embodiments, the location 108 may be identified by one or more location parameters, such as an address, postal code, map quadrant, and/or one or more coordinates and/or other identifiers (e.g., a unique geo-referenced location identifier). According to some embodiments, the location 108 may comprise the one or more objects 130*a-n*. In the case that the location 108 comprises a room (or other interior structural space), for example, the objects 130*a-n* may comprise various furnishings (e.g., moveable objects, such as couches (e.g., sofas), chairs, tables, lamps, rugs, etc.), materials, such as flooring or wall coverings (e.g., structural finishing), fixtures (e.g., plumbing, electrical, and/or other fixtures), and/or features, such as windows, doors, doorways, niches, coffers, stairways, fireplaces, etc.

In some embodiments, the controller device 110 may comprise an electronic and/or computerized controller device, such as a computer server and/or server cluster communicatively coupled to interface with the user device 102 and/or the imaging device 106 (directly and/or indirectly). The controller device 110 may, for example, comprise one or more PowerEdge™ M910 blade servers manufactured by Dell®, Inc. of Round Rock, Tex., which may include one or more Eight-Core Intel® Xeon® 7500 Series electronic processing devices. According to some embodiments, the controller device 110 may be located remotely from one or more of the user device 102 and the imaging device 106. The controller device 110 may also or alternatively comprise a plurality of electronic processing devices located at one or more various sites and/or locations (e.g., a distributed computing and/or processing network), such as the location 108.

According to some embodiments, the controller device 110 may store and/or execute specially-programmed instructions to operate in accordance with embodiments described herein. The controller device 110 may, for example, execute one or more programs that facilitate and/or cause the automatic detection, verification, data capture, and/or data analysis of the location 108 and/or the objects 130*a-n*, as described herein. According to some embodiments, the controller device 110 may comprise a computerized processing device, such as a PC, laptop computer, computer server, and/or other network or electronic device, operated to manage and/or facilitate AI three-dimensional modeling in accordance with embodiments described herein.

In some embodiments, the controller device 110, the user device 102, and/or the imaging device 106 may be in communication with the memory device 140. The memory device 140 may store, for example, mobile device application data, discrete object data, insurance policy data, damage estimation data, location data (such as coordinates, distances, etc.), security access protocol and/or verification data, polygon and/or template data, scoring data, qualitative assessment data and/or logic, and/or instructions that cause various devices (e.g., the controller device 110, the user device 102, and/or the imaging device 106) to operate in accordance with embodiments described herein. In some embodiments, the memory device 140 may comprise any type, configuration, and/or quantity of data storage devices that are or become known or practicable. The memory device 140 may, for example, comprise an array of optical and/or solid-state hard drives configured to store data descriptive of the objects 130*a-n*, device identifier data, data descriptive of the location 108, AI logic and/or training data, image analysis data, image processing data, and/or damage estimation data provided by (and/or requested by) the user device 102 and/or the controller device 110, and/or various operating instructions, drivers, etc. In some embodiments, the memory device 140 may comprise a stand-alone and/or networked data storage device, such as a solid-state and/or non-volatile memory card (e.g., a Secure Digital (SD) card, such as an SD Standard-Capacity (SDSC), an SD High-Capacity (SDHC), and/or an SD eXtended-Capacity (SDXC), and any various practicable form-factors, such as original, mini, and micro sizes, such as those available from Western Digital Corporation of San Jose, Calif.). While the memory device 140 is depicted as a stand-alone component of the system 100 in FIG. 1, the memory device 140 may comprise multiple components. In some embodiments, a multi-component memory device 140 may be distributed across various devices and/or may comprise remotely dispersed components. Any or all of the user device 102, the imaging device 106, and/or the controller device 110 may comprise the memory device 140 or a portion thereof, for example.

Figure 2:
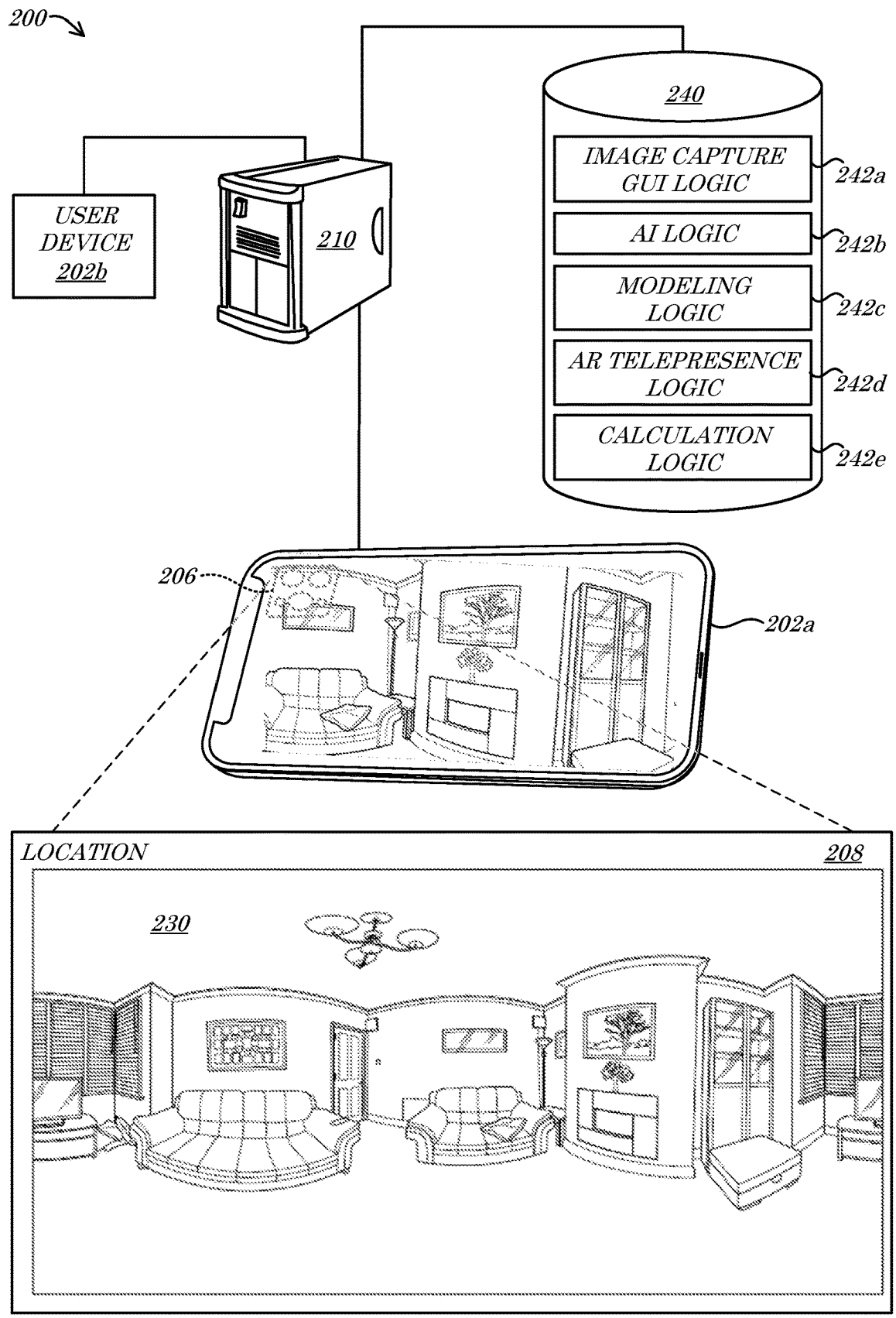
FIG. 2 is a diagram of a system according to some embodiments.

Turning to FIG. 2, a diagram of a system 200 according to some embodiments is shown. In some embodiments, the system 200 may comprise an AI-driven three-dimensional modeling system similar to the system of FIG. 1 herein. The system 200 may comprise, for example, one or more user devices 202*a-b*, a camera 206 disposed to capture data descriptive of a location 208, and/or a server 210. According to some embodiments, a first user device 202*a* may comprise a mobile electronic device, such as a smart phone, equipped with a built-in camera 206. In some embodiments, the camera 206 may be utilized (e.g., as directed and/or controlled by the first user device 202*a*) to acquire image data from the location 208, such as a panoramic image 230. While the panoramic image 230 is depicted for ease of explanation, in some embodiments the panoramic image 230 may comprise a plurality of related and/or overlapping images, a stitched image, and/or other data elements, such as coordinate, distance, location, temperature, color, and/or other data arrays, matrices, lists, etc.

According to some embodiments, a second user device 202*b* may be utilized to access and/or control the server 210 and/or to interface with the first user device 202*a*. In some embodiments, the server 210 may coordinate and/or broker communications between the user devices 202*a-b*. The second user device 202*b* may, for example, be utilized to provide instructions, commands, prompts, and/or other data to the first user device 202*a*, such data being descriptive of desired information to be captured and/or acquired from the location 208. According to some embodiments, the first user device 202*a* comprises a mobile electronic device (as depicted) disposed at or proximate to the location 208 that is operated by a first user (not shown), such as an unskilled user—e.g., a customer, account holder, consumer, and/or homeowner. In some embodiments, the second user device 202b may comprise a device remote from the location 208 that is operated by a second user (also not shown), such as a skilled or trained user—e.g., an underwriter, a claims adjuster, a contractor, engineer, etc. In such embodiments, the second user may utilize the second user device 202b to provide direction, requests, and/or instruction to the first user utilizing the first user device 202a. In such a manner, for example, the second user may assist and/or direct the first user in conducting the tasks (e.g., local to the first user device 202a) that should be accomplished to acquire desired information descriptive of the location 208—e.g., the panoramic image 230.

In some embodiments, data captured and/or acquired by the first user device 202a and/or by the camera 206 may be transmitted from the first user device 202a to the server 210. Once acquired, for example, the panoramic image 230 and/or data descriptive thereof (e.g., tags, metadata) may be transmitted from the first user device 202a to the server 210 (e.g., via a wireless network; not shown). According to some embodiments, the server 210 may forward and/or provide the data (e.g., the panoramic image 230) to the second user device 202b and/or may conduct an assessment of the location 208 based on the acquired data. The server 210 may, for example, access a data storage device 240 storing a plurality of instructions 242a-e. In some embodiments, the server 210 may execute one or more of the instructions 242a-e to analyze and/or assess the data (e.g., the panoramic image 230) provided by the camera 206. The server 210 may, for example, execute a first or image capture Graphical User Interface (GUI) logic 242a to provide a GUI to the first user device 202a. The GUI may, in some embodiments, provide instructions, prompts, and/or may incorporate feedback (e.g., messages, notes) from the second user device 202b, directed to acquiring the panoramic image 230 by the camera 206. Such a GUI may, for example, provide on-screen prompts (not shown) such as bounding boxes, directional queues, etc., that facilitate the capturing of the panoramic image 230 (and/or of other data).

According to some embodiments, the server 210 may execute a second or AI logic 242b. The AI logic 242b may, for example, define instructions that are operable to locate corners, identify a position of the camera 206 (e.g., at a time when the panoramic image 230 is captured), identify walls, ceilings, and/or floors, normalize any identified walls, ceilings, and/or floors, define an array of coordinates and/or points descriptive of the location 208, and/or conduct an assessment of the location 208. In some embodiments, the AI logic 206 may comprise instructions developed automatically by operation of an AI process that is seeded with a training data set (not shown). The AI logic 242b may be trained, for example, utilizing a plurality of other images (not shown) and associated analysis and/or assessment results, such that the AI logic 242b may effectively reverse engineer and/or derive a set of rules, thresholds, and/or decision trees. According to some embodiments, the AI logic 242b may be utilized to parse the panoramic image 230 into segments representing the various three-dimensional components of a structural space at the location 208 (e.g., in a standard rectilinear room, four (4) walls, a ceiling, and/or a floor).

In some embodiments, the server 210 may execute a third or modeling logic 242c. The modeling logic 242c may, for example, comprise rules defining how structural space inputs (e.g., data defining walls, ceilings, and/or floors) are processed to generate a three-dimensional projection and/or representation of the location 208. The modeling logic 242c may input results from the AI logic 242b, for example, and may process the results to create a three-dimensional projection representing the location 208. According to some embodiments, the server 210 may execute a fourth or Augmented Reality (AR) telepresence logic 242d that manages and/or permits communications with the second user device 202b. The AR telepresence logic 242d may, for example, establish communications between the user devices 202a-b to permit a user of the second user device 202b to instruct and/or guide a user of the first user device 202a, e.g., via one or more AR prompts (not shown). In some embodiments, the AR telepresence logic 242d may provide the three-dimensional projection and/or model generated by the modeling logic 242c to one or more of the user devices 202a-b.

According to some embodiments, the server 210 may execute a fifth or calculation logic 242e. The calculation logic 242e may, for example, comprise a plurality of spatial distance and/or referential formulas that are operable to act upon coordinate inputs (such as an array of coordinates provided by the AI logic 242b) to calculate various distances, dimensions, ratios, sizes, etc. In some embodiments, the calculation logic 242e may be executed in coordination with the image capture GUI logic 242a, the AI logic 242b, the modeling logic 242c, and/or the AR telepresence logic 242d, to permit a user to interact with one or more of the panoramic image 230, deconstructed portions of the panoramic image 230, and/or a three-dimensional model of the location 208 (e.g., derived from the panoramic image 230), to measure and/or calculate relational data metrics. The calculation logic 242e may be utilized, for example, to measure distances between objects (not separately numbered in FIG. 2) and/or across or between various portions of the three-dimensional model of the location 208.

Fewer or more components 202a-b, 206, 208, 210, 230, 240, 242a-e and/or various configurations of the depicted components 202a-b, 206, 208, 210, 230, 240, 242a-e may be included in the system 200 without deviating from the scope of embodiments described herein. In some embodiments, the components 202a-b, 206, 208, 210, 230, 240, 242a-e may be similar in configuration and/or functionality to similarly named and/or numbered components as described herein. In some embodiments, the system 200 (and/or portions thereof) may comprise an automatic AI three-dimensional modeling program, system, and/or platform programmed and/or otherwise configured to execute, conduct, and/or facilitate the methods/processes 400, 600 of FIG. 4 and/or FIG. 6 herein, and/or portions or combinations thereof.

Figure 3:
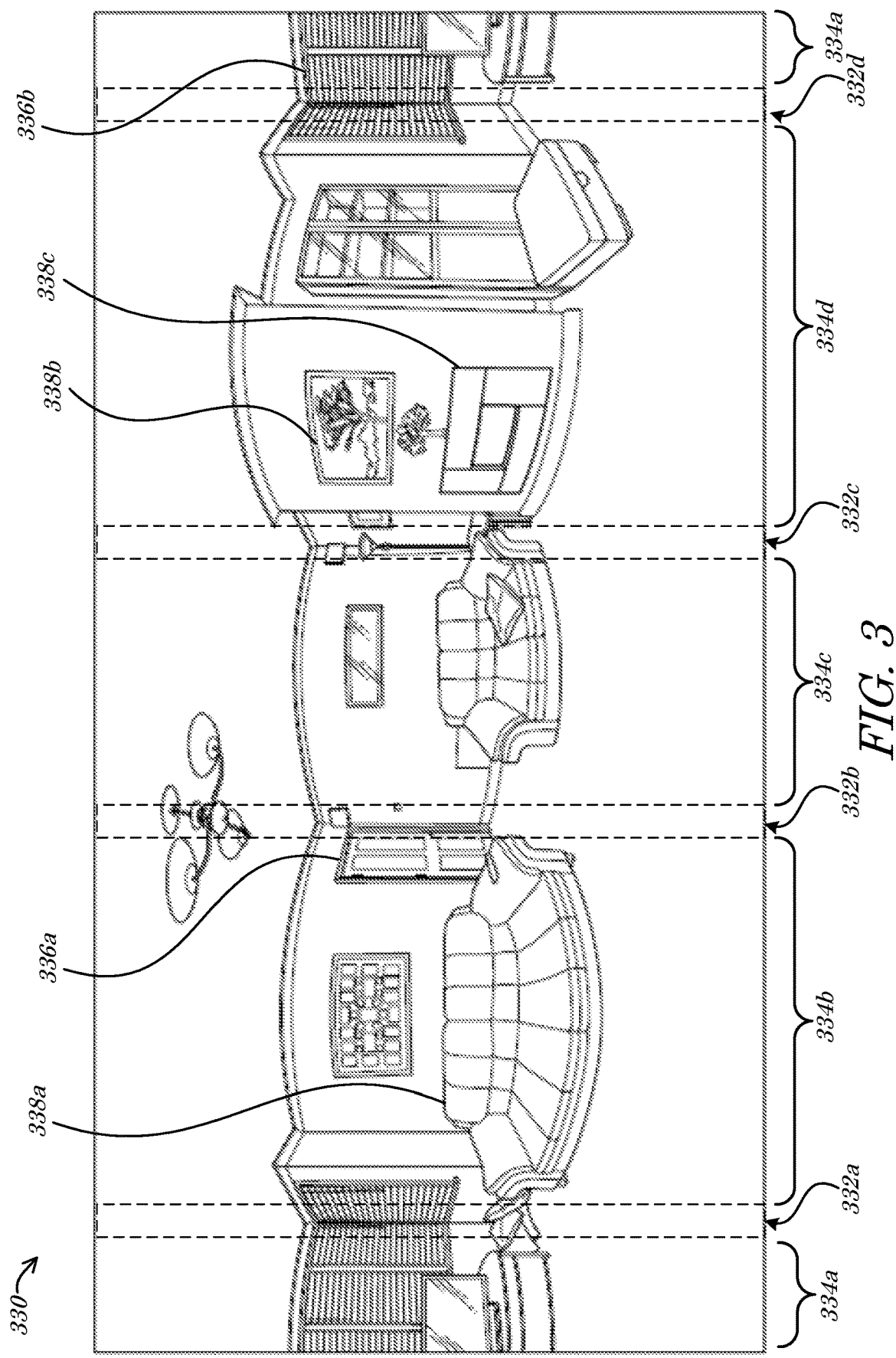
FIG. 3 is a diagram of an example panoramic image according to some embodiments

Referring now to FIG. 3, a diagram of an example panoramic image 330 according to some embodiments is shown. In some embodiments, the example panoramic image 330 (referred to as the "image" 330, for ease of reference) may comprise a captured and/or recorded depiction (graphical, numerical, and/or referential) of a location, such as a room in a building (or other property, parcel, etc.), as depicted in FIG. 3 for non-limiting purposes of example. In some embodiments, the panoramic image 330 may comprise a plurality of features and/or characteristics that are identified by an image processing application, such as an AI-enabled object recognition program. In some embodiments, the example panoramic image 330 may comprise and/or define, for example, a plurality of corner regions 332a-d, a plurality of wall regions 334a-d, a plurality of features 336a-b, and/or a plurality of objects 338a-c.

According to some embodiments, any or all of the features/characteristics 332a-d, 334a-d, 336a-b, 338a-c may be utilized by processes described herein to effectuate AI three-dimensional modeling. An AI image analysis and/or three-dimensional modeling program may, for example, process the example panoramic image 330 and identify the plurality of corner regions 332a-d, e.g., based on application of corner region identification logic. The AI program may be coded, in some embodiments, to evaluate lines and/or patterns within the example panoramic image 330 to identify the plurality of corner regions 332a-d. While the plurality of corner regions 332a-d are depicted as areas having a visible width dimension for ease of illustration, in some embodiments the plurality of corner regions 332a-d may comprise discrete lines identified in and/or projected on the example panoramic image 330. The AI program may identify, by analyzing curvatures of junction lines between various portions of the example panoramic image 330, for example, a plurality of points where the curvature and/or angle suggests the existence of one of the plurality of corner regions 332a-d. The AI program may scan multiple portions of the example panoramic image 330 and identify multiple sets of such points. According to some embodiments, the AI program may mathematically analyze the sets of points to determine and/or identify any correlations, and discrete sets of correlated points may identify individual corner regions 332a-d. In some embodiments, such as in the case that it is presumed that the example panoramic image 330 is descriptive of a room having four (4) corner regions 332a-d (e.g., a rectilinear geometry), the AI program may rank analysis results to identify the four (4) most highly scoring or ranking sets of identified points as the corner regions 332a-d.

In some embodiments, areas and/or portions of the example panoramic image 330 that are situated between adjacent corner regions 332a-d may be identified (e.g., by the AI program) as comprising the wall regions 334a-d. The corner regions 332a-d may, for example, identify transition points between different wall regions 334a-d. According to some embodiments, the AI program may identify the wall regions 334a-d by segmenting the example panoramic image 330 utilizing the corner regions 332a-d as break lines. In some embodiments, the wall regions 334a-d may be further segmented and/or trimmed by removing portions (not depicted) identified as corresponding to ceiling and floor areas. According to some embodiments, the wall regions 334a-d may be normalized. Distortions of the example panoramic image 330 due to lens characteristics of the acquiring device (not shown), inaccurate image stitching (in the case that the example panoramic image 330 comprise a plurality of combined images), and/or parallax, for example, may be identified and processed through one or more correction algorithms to convert the distorted example panoramic image 330 (or portions thereof, such as the wall regions 334a-d) into an orthographic format.

According to some embodiments, lines, patterns, and/or pixels in the example panoramic image 330 may be analyzed (e.g., by the AI program) to identify one or more of the features 336a-b. The example panoramic image 330 may be systematically analyzed, for example, to identify patterns that match patterns and/or characteristics stored in memory (e.g., a database; not shown). The AI program may analyze the example panoramic image 330 and identify a match between stored feature data and a first feature 336a, for example. According to some embodiments, the matching of the geometries and/or image artifacts (e.g., lines, colors, pixels, hue, saturation, etc.) may permit a cross-reference to a categorization of the first feature 336a. Stored data may relate the first feature 336a to a stored indication of a doorway, for example, and/or to a specific type of architectural feature. In some embodiments, AI image processing may also or alternatively identify and/or classify a second feature 336b as a window, or as depicted, a bay window. According to some embodiments, the relative spatial relationships between the identified features 336a-b, wall regions 334a-d, and/or corner regions 332a-d may be identified, measured, and/or calculated. Each feature 336a-b may be tagged and/or associated with (e.g., via stored data relationships) a particular corresponding wall region 334a-d, for example, or in the case of the second feature/window 336b that spans multiple wall regions 334a-d, it may be tagged and/or associated with each of the respective and/or corresponding first, second, and fourth wall regions 334a, b, and d (and/or with corner regions 332a and 332d).

In some embodiments, various objects 338a-c may be identified via AI image processing of the example panoramic image 330. Applying learned and/or programmed object recognition algorithms, for example, an AI program may analyze (e.g., systematically search through and/or process) various patterns and/or characteristics within the example panoramic image 330 to identify areas that match stored patterns and/or characteristics. The AI program may, for example, compare portions of the second wall region 334b to stored image pattern data to identify a first object 338a and/or classify the first object 338a as a couch (and/or a particular type, brand, model, and/or material thereof). According to some embodiments, portions of a fourth wall region 334d may be analyzed with pattern matches being identified for each of a second object 338b and a third object 338c. The rectilinear shapes of the second and third objects 338b-c may be identified, for example, and colors and/or patterns within the identified bounds of the second object 338b may be matched to a painting type of object. In some embodiments, the relative location of the third object 338c, e.g., being close to a bottom portion of the fourth wall region 334d, may be utilized to classify the third object 338c as a fireplace.

According to some embodiments, various measurements, calculations, and/or determinations may be derived from the example panoramic image 330. In some embodiments, for example, the segmented and/or normalized wall regions 334a-d may be parsed into and/or assigned a coordinate reference system. In the case that the wall regions 334a-d are normalized into orthographic and/or rectilinear projections, for example, a rectilinear coordinate system identifying various points throughout each wall region 334a-d may be identified, computed, and/or assigned. In some embodiments, an array of coordinates assigned to the wall regions 334a-d may correspond to each pixel or instance of data that comprises the example panoramic image 330. In such a manner, for example, each pixel of the example panoramic image 330 may be uniquely identified and/or referenced with respect to other pixels (e.g., presuming that the size of the pixels is known, calculated, and/or otherwise derived). According to some embodiments, the array of coordinates may be utilized to evaluate the various objects 338a-c. The coordinates may be utilized, along with referential distance estimations based on identified objects 338a-c and/or features 336a-b, for example, to estimate sizes and/or positions of the various features 336a-b and/or objects 338a-c.

In some embodiments, the doorway 336a may be analyzed to determine that the range of the coordinates comprising the portion of the second wall region 334b that the doorway 336a occupies define dimensions of the doorway 336a. In the case that the size of the pixels and/or coordinates is known (e.g., pre-programmed and/or derived), the dimensions may be converted into and/or expressed as real-world dimensions representing the estimated size of an actual doorway (not shown) that the doorway 336a in the example panoramic image 330 represents. Dimensions of the window 336b may be similarly calculated. The dimensional and/or sizing information may then be utilized, according to some embodiments, to assess the features 336a-b. Doors and windows for larger doorway 336a and window 336b openings may cost more to replace than smaller versions, for example, and values may be cross-referenced based on the sizing information to derive and/or calculate one or more replacement, repair, servicing, and/or other costs associated with the features 336a-b. Similarly, characteristics and/or sizes of the objects 338a-c may be utilized to identify an expected replacement value for the couch 338a, for example, and/or to estimate a level of risk, hazard, and/or pollution attributable to the fireplace 338c.

According to some embodiments, positions and/or distances related to the features 336a-b and/or objects 338a-c may also or alternatively be processed (e.g., utilizing a stored rule set associated with the different classifications thereof). A distance (not shown) from the doorway 336a to the couch 338a may be calculated based on the relative positions derived for the doorway 336a and the couch 338a, for example, and compared to a stored threshold and/or rule regarding furniture proximity to doorways. In the case that the couch 338a is determined to be closer to the doorway 336a than a stored threshold, for example, an applicable rule may be identified as not being met. Similarly, a rule may be stored that specifies that no furnishings should be within two feet (2-ft.) of the fireplace 338c. In some embodiments, the distance between the fireplace 338c and the painting 338b may be derived and/or calculated based on the coordinate array for the fourth wall region 334d and compared to the minimum threshold. In the case that the painting 338b is determined to be farther from the fireplace 338c than the specified threshold (e.g., farther than two feet (2-ft.) away), the rule may be determined to have been met and/or satisfied. In some embodiments, various scores, rankings, determinations, assessment results, and/or other output may be derived, calculated, computed, and/or retrieved based on the various rule evaluations.

Fewer or more components 332a-d, 334a-d, 336a-b, 338a-c and/or various configurations of the depicted components 332a-d, 334a-d, 336a-b, 338a-c may be included in the example panoramic image 330 without deviating from the scope of embodiments described herein. In some embodiments, the components 332a-d, 334a-d, 336a-b, 338a-c may be similar in configuration and/or functionality to similarly named and/or numbered components as described herein. In some embodiments, the example panoramic image 330 (and/or portions thereof) may comprise an automatic AI three-dimensional modeling program, system, and/or platform programmed and/or otherwise configured to execute, conduct, and/or facilitate the methods/processes 400, 600 of FIG. 4 and/or FIG. 6 herein, and/or portions or combinations thereof.

III. AI Three-Dimensional Modeling Processes

Figure 4:
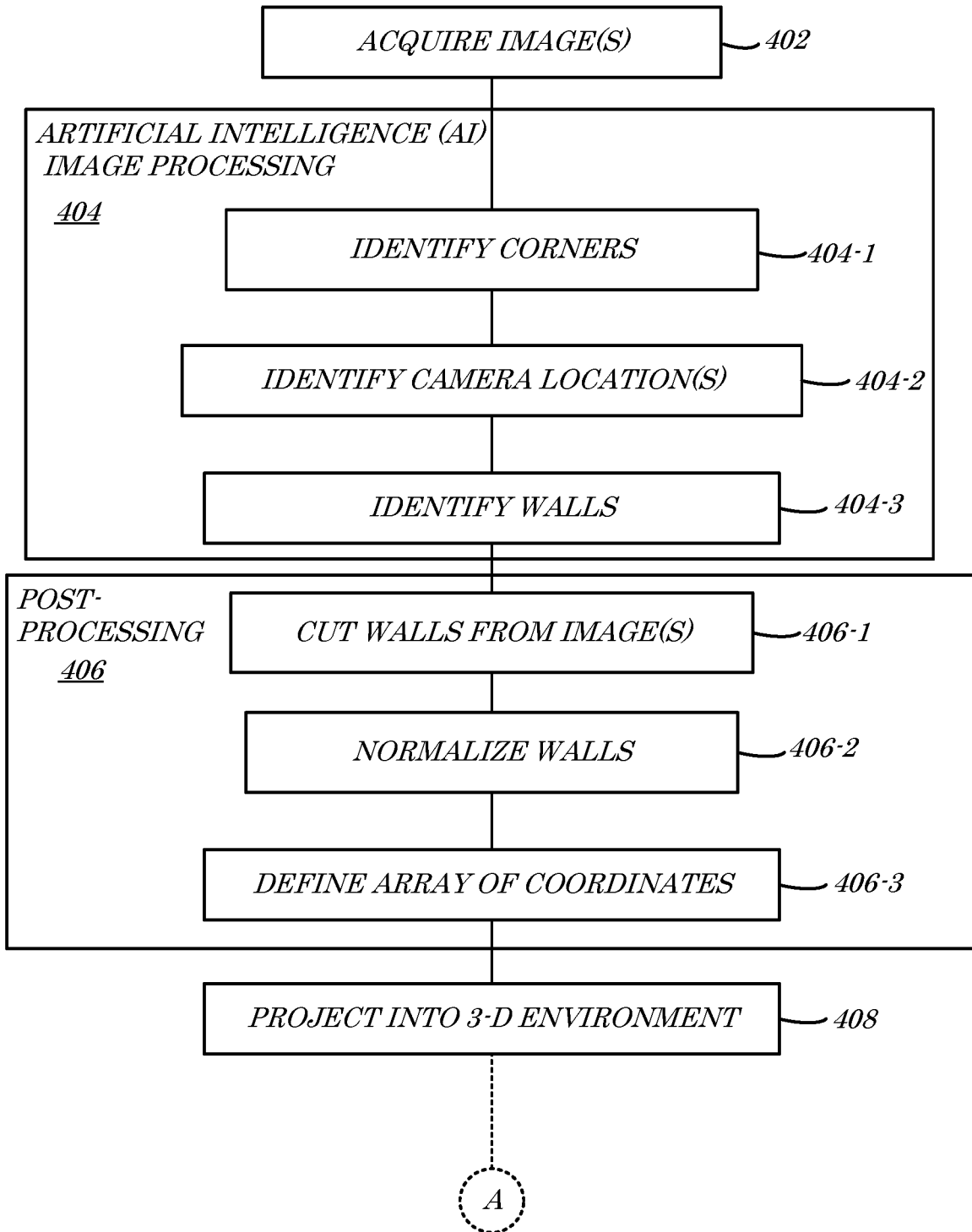
FIG. 4 is a flow diagram of a method according to some embodiments.

Referring now to FIG. 4, a flow diagram of a method 400 according to some embodiments is shown. In some embodiments, the method 400 may be performed and/or implemented by and/or otherwise associated with one or more specialized and/or specially-programmed computers (e.g., one or more of the user devices 102, 202a-b, the imaging device/camera 106, 206, the controller device/server 110, 210, and/or the apparatus 810 of FIG. 1, FIG. 2, and/or FIG. 8 herein), computer terminals, computer servers, computer systems and/or networks, and/or any combinations thereof (e.g., by one or more multi-threaded and/or multi-core processing units of an AI three-dimensional modeling data processing system). In some embodiments, the method 400 may be embodied in, facilitated by, and/or otherwise associated with various input mechanisms and/or interfaces (such as the interface 720 of FIG. 7 herein).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 240, 840, 940a-e of FIG. 1, FIG. 2, FIG. 8, FIG. 9A, FIG. 9B, FIG. 9C, FIG. 9D, and/or FIG. 9E herein) may store thereon instructions that when executed by a machine (such as a computerized processor) result in performance according to any one or more of the embodiments described herein.

In some embodiments, the method 400 may comprise acquiring (e.g., by an electronic processing device and/or from a sensor/imaging device) one or more images, at 402. One or more sensors, such as cameras, data transceivers, range finding devices, and/or other imagery and/or data acquisition devices, may, for example, be utilized to capture data descriptive of a location that includes one or more objects, such as features and/or furnishings of a room in a building. In some embodiments, the capturing of the data may occur in response to a request for the data. One or more signals may be transmitted from a user and/or controller device to one or more imaging devices, for example, to initiate and/or conduct data acquisition for one or more desired locations and/or objects. According to some embodiments, whether the data is captured on-demand, in response to a specific request, or as part of an overall data acquisition process, the data may be provided via one or more data storage devices, such as a data/imagery repository. In some embodiments, such data may be made available by one or more third parties that may or may not charge a fee to access the data. According to some embodiments, the data may comprise any quantity, type, and/or configuration of data that is or becomes known or practicable. The data may include, for example, a plurality of data bands, such as different color bands and/or various point data, such as elevations, locations, etc. In some embodiments, the data may comprise various imagery bands, such as visible colors (e.g., RGB), near-IR, IR, and/or point cloud data, such as a Digital Elevation Model (DEM). According to some embodiments, the image/data may comprise a single panoramic image or multiple images, each representing an entire three hundred sixty degree (360°) view of a structural area and/or location.

According to some embodiments, the method 400 may comprise utilizing the acquired image(s) for AI image processing, at 404. The AI image processing at 404 (and/or the method 400) may comprise, for example, identifying (e.g., by the electronic processing device) corners, at 404-1. According to some embodiments, a plurality of shape files (and/or other shape-indicative information) may be stored in relation to a plurality of identifiable objects, such as room features, furnishings, and/or characteristics, and one or more of such files/information may be selected based at least in part on a characteristic of the location (e.g., the location at which the imagery/data is captured and/or acquired). In some embodiments, for example, it may be determined (e.g., based on geospatial and/or account information) that a particular location comprises an office building or a home. According to some embodiments, such information may be stored in association with a customer (current and/or potential) account, profile, and/or other identifier and/or retrieved utilizing such an identifier as a data query key. In some embodiments, the shape file may comprise any type, quantity, and/or configuration of shape information that is or becomes practicable, such as, but not limited to, an image file, a template, geospatial vector data, point data, line data, polygon data, coordinate data, and/or other pattern, geometry, color, and/or configuration data. In some embodiments, the shape file may be defined and/or stored in accordance with one or more data formatting standards, such as the Environmental Systems Research Institute (ESRI) Shapefile Technical Description 3-7855 published July, 1998 by ESRI, Inc. of Redlands, Calif. In some embodiments, the shape file may define known and/or estimated extents, colors, patterns, and/or geometries of a particular object, such as a room corner, couch, fireplace, conference room table, doorway, etc. According to some embodiments, portions of the acquired image(s) may be compared to one or more stored shape files (and/or parameters thereof) to identify likely matches. As different lighting conditions, viewpoints/angles, and/or different camera/sensor configurations may cause a wide variation in image details, it should be understood that an AI-based program conducting image analysis may generally perform mathematical calculations (e.g., regression, best fit, etc.) to identify "matches" that fall within various parameter ranges, but that perfect mathematical "matches" reaching the level of mathematical equivalence are likely to be rare. Accordingly, portions of the image(s) may be compared to stored shapes, colors, textures, patterns, etc., and in the case that the number of similarities falls within a predetermined threshold, a "match" may be established or identified. According to some embodiments, in the case that a portion of the image(s) is determined to match stored data descriptive of a corner of a room, corresponding portions of the image may be tagged and/or otherwise identified as a corner. Different corners may be identified based on different positioning information with the image. Points in the image that are identified as corner points and that are identified as being generally aligned with other corner points along a particular line and/or in a particular direction (e.g., vertically, in terms of how the image(s) may represent the real room) may be grouped together to identify a particular corner, while other corner points disposed along different lines and/or regions may be identified and/or grouped as other corners.

In some embodiments, the AI image processing at 404 (and/or the method 400) may comprise identifying (e.g., by the electronic processing device) a camera location, at 404-2. Estimated distances derived by evaluating the image(s) utilizing a mathematical parallax model may be utilized, for example, to calculate a viewpoint location derived based on the locations of the corners in the image(s). The curvature and/or distances between lines and/or artifacts in the image may be utilized as input, in some embodiments, to calculate an estimated distance of the viewpoint to each of the identified corner locations/regions. According to some embodiments, the AI image processing at 404 (and/or the method 400) may comprise identifying (e.g., by the electronic processing device) walls, at 404-3. One or more trained AI algorithms may be employed, for example, to identify an occurrence of an image/data pattern/value that matches predefined AI criteria indicative of a particular type of identifiable feature (such as a corner at 404-1 and/or a wall at 404-3, and/or other features or objects). In some embodiments, the locations and/or extents of the identified corners may be utilized to identify and/or define one or more walls (i.e., wall regions within the image(s)). Areas of the image(s) occurring between consecutive corners and/or corner regions may be identified as wall regions, for example.

According to some embodiments, the method 400 may comprise utilizing the acquired image(s) (e.g., as-processed by the AI image processing at 404) for AI image post-processing, at 406. In some embodiments, the AI image post-processing at 406 (and/or the method 400) may comprise cutting (e.g., by the electronic processing device) the walls from the image(s), at 406-1. While the term "cutting" is utilized as an example operation label, in some embodiments, additional or alternate operations, such as trimming, segmenting, copying, duplicating, extracting, and/or exporting may be conducted. According to some embodiments, regardless of the specific operation utilized, any or all identified wall regions and/or portions may be uniquely identified and/or separated (e.g., mathematically) from the underlying image(s). According to some embodiments, the AI image post-processing at 406 (and/or the method 400) may comprise normalizing (e.g., by the electronic processing device) the walls, at 406-2. The cut and/or otherwise segmented and/or identified wall regions may, for example, generally be curved and/or distorted due to differences in viewpoints, angles, lens characteristics, etc. In some embodiments, such distortions may be corrected and/or accounted for by processing the wall regions utilizing an AI normalization process that transforms the wall portions into an orthogonal and/or rectilinear projection or form. In the case that it is assumed that the actual room is rectilinear, for example, the wall areas and/or regions may be corrected to model the real-world geometry. The normalization may comprise, in some embodiments, a relocation of a plurality of pixels of the image(s) to transform the image(s) bound to fit within a rectilinear template.

According to some embodiments, the AI image post-processing at 406 (and/or the method 400) may comprise defining (e.g., by the electronic processing device) an array of coordinates, at 406-3. Each pixel and/or other identifiable sub-portion or element of the image(s) may be assigned a coordinate and/or value, for example, such as a unique and/or sequential identifier. In some embodiments, each pixel or element may be assigned multiple values that together uniquely identify the pixel/element. In the case of a two-dimensional image/data, for example, each pixel/element may be assigned two values, e.g., one for each axis or dimensional direction. According to some embodiments, additional values (e.g., dimensional values) may be assigned, depending upon the content of the underlying and/or original image/sensor data. In some embodiments, a uniform coordinate and/or size system and/or template may be applied to each identified wall region, corner region, and/or other object identified in the image/data. According to some embodiments, three-dimensional positioning data may be utilized, such as a first value with respect to a first dimension (e.g., an x-axis or horizontal direction), a second value with respect to a second dimension (e.g., a y-axis or vertical direction), and/or a third value with respect to a third dimension (e.g., a z-axis or depth direction; e.g., with respect to a depth datum, such as the calculated/derived camera position). While the defining/assigning of coordinates to an array of image/sensor elements at 406-3 and the AI image post-processing at 406 are depicted as comprising separate and/or distinct processes from the AI image processing at 404, in some embodiments the defining at 406-3 and/or the AI image post-processing at 406 may comprise a portion of the AI image processing at 404.

In some embodiments, the method 400 may comprise projecting (e.g., by the electronic processing device) the image(s) (and/or the array of coordinates) into a three-dimensional environment, at 408. The normalized wall region data may be utilized (alone or in conjunction with the corner region data), for example, to populate a three-dimensional virtual environment (e.g., a computer model). In some embodiments, the different wall regions, corners, and/or even ceiling and floor regions may be stitched or joined together within the three-dimensional environment to form a three-dimensional virtual model of the location at which the image(s)/sensor data was captured/acquired. In such a manner, for example, a representation of the location may be readily generated and made available (e.g., via a user's mobile electronic device). While the projecting at 408 is depicted as comprising a separate and/or distinct process from the AI image processing 404, in some embodiments the projecting at 408 may comprise a portion of the AI image processing at 404. According to some embodiments, the method 400 may comprise and/or may trigger and/or proceed to perform additional operations and/or procedures, such as one or more AI-based structural area/location assessment procedures, at "A" (described with respect to the method 600 of FIG. 6 herein).

Figure 5:
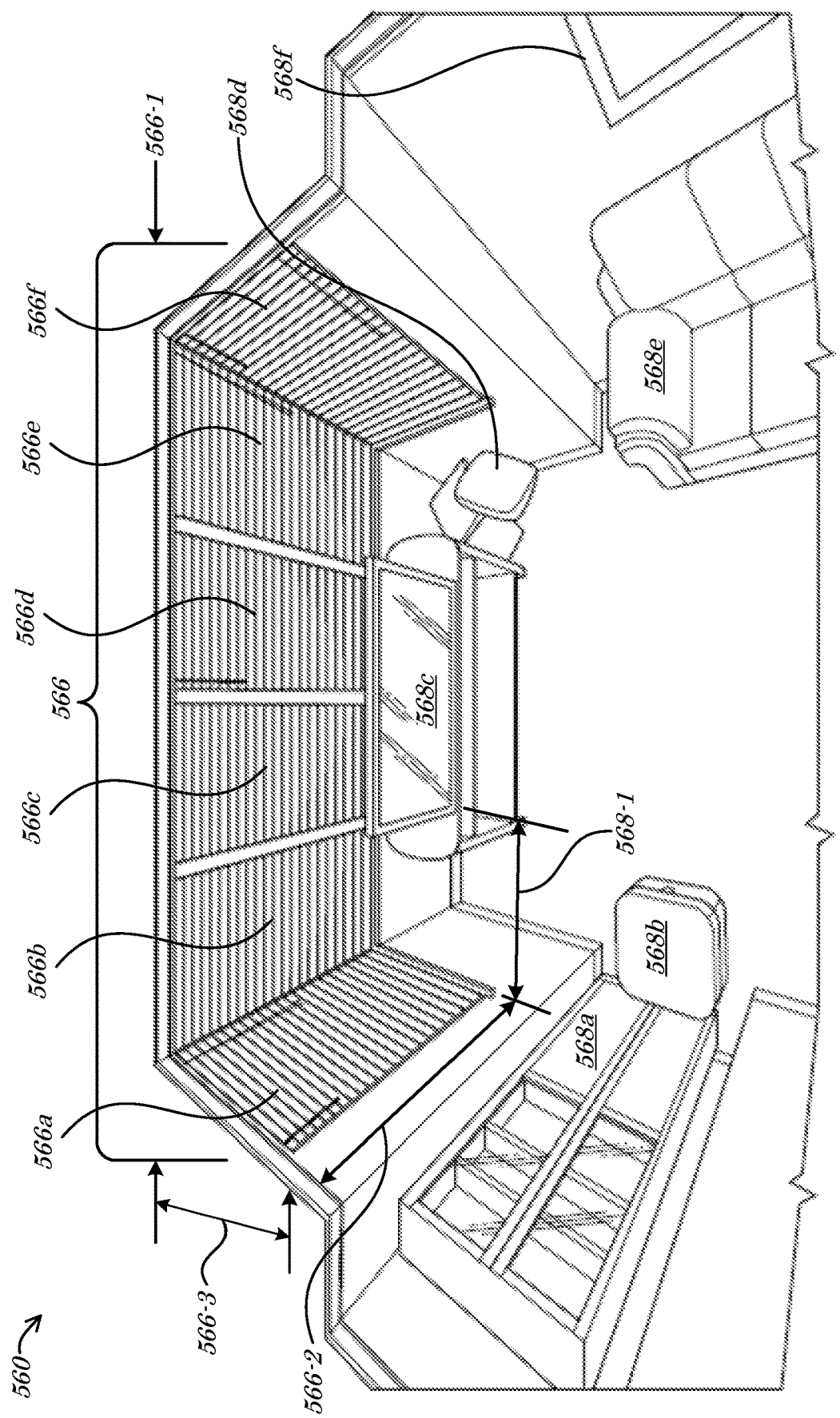
FIG. 5 is a perspective diagram of three-dimensional model according to some embodiments.

Referring now to FIG. 5, a perspective diagram of three-dimensional model 560 according to some embodiments is shown. In some embodiments, the three-dimensional model 560 may be associated with and/or comprise output from an AI image processing procedure, such as the method 400 of FIG. 4 herein, and/or a portion thereof (e.g., the projecting at 408). The three-dimensional model 560 may be generated and/or defined, for example, by one or more images (and/or other sensor data) acquired at a location and fed through an AI image processing program that, e.g., identifies corners, walls, ceiling, floor, features, furnishings, finishes, materials, and/or objects in the images/data. According to some embodiments, the three-dimensional model 560 may be generated from a plurality of normalized wall segments and/or regions derived from one or more images of the location. According to some embodiments, the three-dimensional model 560 depicted in FIG. 5 may comprise a portion of a larger model (not shown)—e.g., of an entire room, building, etc.

In some embodiments, the three-dimensional model 560 may comprise and/or define a feature 566 of the room, such as the bay window as depicted in FIG. 5. As depicted, the bay window 566 may comprise a plurality of individual panes, portions, and/or windows 566*a-f*. According to some embodiments, the three-dimensional model 560 may be utilized to identify and/or compute a width 566-1 of the bay window 566, a height 566-2 of the bay window 566, and/or a depth 566-3 of the bay window 566. In the case that the portions of the three-dimensional model 560 comprising the bay window 566 are known, for example, corresponding three-dimensional coordinates may be utilized to calculate the various dimensions 566-1, 566-2, 566-3. In such a manner, for example, an area of the bay window 566 may be calculated (e.g., by multiplying the dimensions 566-1, 566-2, 566-3) based on the three-dimensional model 560. As depicted, the depth 566-3 of the bay window 566 (e.g., a third dimension) may be utilized to compute a length of a first window 566*a* and/or a sixth window 566*f*; the width 566-1 of the bay window 566 (e.g., in a first dimension) may be utilized to compute a length of a second, third, fourth, and fifth windows 566*b-e*; and/or the height 566-2 of the bay window 566 (e.g., a second dimension) may be representative of all of the windows 566*a-f*. In some embodiments, the various widths 566-1 and/or lengths 566-3 may be added to determine an overall length of the bay window 566 and the sum may be multiplied by the height 566-2 to derive the area of the bay window 566. In some embodiments, the area, dimensions 566-1, 566-2, 566-3, and/or other characteristics of the bay window 566 (and/or other features) may be utilized to compute an assessment for the location, as described herein.

According to some embodiments, the three-dimensional model 560 may comprise and/or define a plurality of objects 568*a-f*. The objects 568*a-f* may, for example, be projected and/or placed based on objects identified in the underlying images/sensor data utilized to generate the three-dimensional model 560. The objects 568*a-f* may comprise, in some embodiments, a cabinet 568*a*, an ottoman 568*b*, a television 568*c*, pillows 568*d*, a couch 568*e*, and/or a mirror 568*f*. According to some embodiments, the locations of the objects 568*a-f* may be utilized to compute an assessment for the location. The quantities, brands, conditions, and/or types (e.g., classifications) of the objects 568*a-f* may be utilized, for example, to evaluate one or more rules evaluated by an AI structural space analysis program. In some embodiments, a distance 568-1 from one of the objects 568*a-f*, such as the television 568*c* to another object 568*a-b*, 568*d-f* and/or to a feature, such as the bay window 566 (and/or to a wall, ceiling, floor, etc.; not separately labeled) may also or alternatively be utilized to assess the location. One or more rules may utilize the distance 568-1, for example, to evaluate a condition with respect to the television 568*c*. In the case that the distance 568-1 is shorter than a threshold distance stored in relation to the rule, in some embodiments, the rule may not be met—e.g., the condition may fail to be satisfied.

Fewer or more components 566, 566*a-f*, 566-1, 566-2, 566-3, 568*a-f* and/or various configurations of the depicted components 566, 566*a-f*, 566-1, 566-2, 566-3, 568*a-f* may be included in the three-dimensional model 560 without deviating from the scope of embodiments described herein. In some embodiments, the components 566, 566*a-f*, 566-1, 566-2, 566-3, 568*a-f* may be similar in configuration and/or functionality to similarly named and/or numbered components as described herein. In some embodiments, the three-dimensional model 560 (and/or portions thereof) may comprise an automatic AI three-dimensional modeling program, system, and/or platform programmed and/or otherwise configured to execute, conduct, and/or facilitate the methods/processes 400, 600 of FIG. 4 and/or FIG. 6 herein, and/or portions or combinations thereof.

Figure 6:
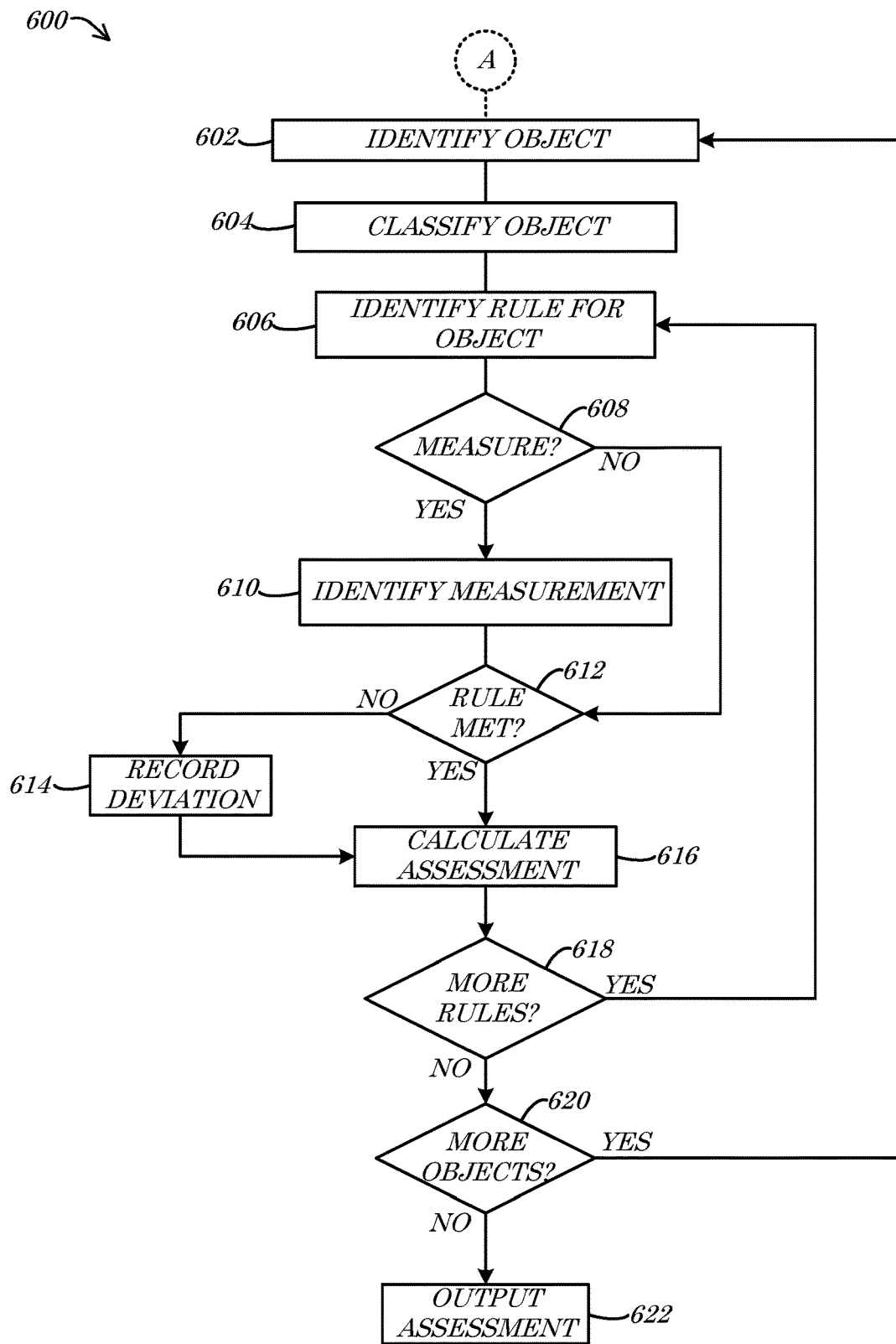
FIG. 6 is a flow diagram of a method according to some embodiments.

Turning now to FIG. 6, a flow diagram of a method 600 according to some embodiments is shown. In some embodiments, the method 600 may be performed and/or implemented by and/or otherwise associated with one or more specialized and/or specially-programmed computers (e.g., one or more of the user devices 102, 202*a-b*, the imaging device/camera 106, 206, the controller device/server 110, 210, and/or the apparatus 810 of FIG. 1, FIG. 2, and/or FIG.

8 herein), computer terminals, computer servers, computer systems and/or networks, and/or any combinations thereof (e.g., by one or more multi-threaded and/or multi-core processing units of an AI three-dimensional modeling data processing system). In some embodiments, the method 600 may be embodied in, facilitated by, and/or otherwise associated with various input mechanisms and/or interfaces (such as the interface 720 of FIG. 7 herein).

In some embodiments, the method 600 may begin at "A", e.g., as a continuation and/or portion of the method 400 of FIG. 4 herein. According to some embodiments, the method 600, whether beginning from "A" or otherwise, may comprise identifying (e.g., by an electronic processing device) an object, at 602. Whether two-dimensional or three-dimensional data is utilized, for example, such data may be analyzed by comparing lines, patterns, pixels, colors, and/or other artifacts in the data (e.g., image data) to a library of stored shapes, lines, patterns, etc. In the case that a correspondence between the stored data and the analyzed data is identified, an existence of an object may be defined. In some embodiments, such as in the case that the analyzed data comprises an array of coordinates, various size, dimension, and/or geometric information descriptive of the identified object may be determined. According to some embodiments, a portion of the underlying data (e.g., a portion of an image, wall region, and/or three-dimensional model) may be identified as corresponding to and/or being enclosed within the bounds of the identified object. In some embodiments, any colors, shapes, patterns, temperatures, distances, and/or other data within the bounds of the object may be identified and/or stored in relation to the object (e.g., as characteristics thereof).

According to some embodiments, the method 600 may comprise classifying (e.g., by the electronic processing device) the object, at 604. One or more characteristics of the object may be compared to stored characteristic library and/or cross-reference data, for example, to compare the color, size, shape, label information, logos, brand names, and/or other data descriptive of the object to stored object characteristic data. In such a manner, for example, an identification of an object of a certain size and/or shape may be compared to stored sizes and/or shapes to determine that the identified object matches (e.g., to a threshold level of mathematical certainty and/or correspondence) and is accordingly of the same class as the stored type (e.g., a couch, chair, light fixture, etc.). According to some embodiments, characteristics of the object, such as color, pattern (e.g., texture), logo and/or label data, etc. may be utilized to identify the corresponding class, confirm the identified class, and/or further categorize and/or classify the object. An object may be identified as a television based on geometric features of the object as compared to stored shape geometries for known object types, for example, and may be further classified as a flat screen television based on at least one size dimension (e.g., depth) and/or may be further classified as a SONY® television based on an identified occurrence of the word "sony" somewhere within the object bounds.

In some embodiments, the method 600 may comprise identifying (e.g., by the electronic processing device) a rule for the object, at 606. Once the object is classified, for example, stored data may be queried and/or accessed to determine a rule that is applicable to the classification assigned to the object. In the ongoing example of a television, for example, it may be determined that several rules apply, such as a first rule specifying that televisions should be placed no closer than three feet (3 ft.) from a water or heat source and/or a second rule specifying that televisions over a certain size correspond to a particular value of a risk parameter (e.g., a score of four (4) on a scale representing cost to replace). In some embodiments, identified rules may be related or unrelated. Rules may be established in a hierarchy and/or dependent relationship, for example, and/or may be related via more complex decision tree and/or nodal reasoning connections representing a pre-programmed AI-based logic map. According to some embodiments, any identified rule may be associated with, assigned, and/or may define one or more point values. A binary rule may correspond to a point value of zero (0) in the case that a first binary result for the rule is evaluated, for example, and may correspond to a point value of one (1) or ten (10) in the case that a second binary result for the rule is evaluated. In some embodiments, the point value (or values) may be based on one or more formulas. A point value for a rule may comprise a formula that includes an input variable related to the rule (e.g., a measurement between two objects), for example, and a function that relates various values of the input variable to one or more output point values. A square or linear foot measurement of all windows identified in a room, for example, may evaluate to a point value ranging from zero (0) to one hundred (100) depending upon the measurement value. Measured window length/area values under a predetermined threshold may resolve (e.g., based on application of a mathematical formula) to zero (0) points, for example, while measurements over the threshold may correspond to ten (10) points for every foot over the threshold. In some embodiments, score/point values for a plurality of rules may be summed to achieve a point or score total, average, etc.

According to some embodiments, the method 600 may comprise determining (e.g., by the electronic processing device) whether a measurement should be taken, at 608. An identified rule may rely on various data, for example, such as data acquired and/or capable of being derived from acquired image/sensor data. In some embodiments, the rule may be based on or take into account one or more distances and/or dimensions. According to some embodiments, acquired image/sensor data processed by an AI three-dimensional modeling program as described herein may be utilized to derive (e.g., "measure") the one or more distances/dimensions, and the rule may request and/or require that such a measurement/derivation be accomplished. While distance measurements are utilized as an example parameter upon which the rule may be based, in some embodiments other or additional data, parameters, values, and/or metrics may be utilized by the rule. In the case that it is determined that the rule requires a measurement (or other data), the method 600 may proceed to and/or comprise identifying (e.g., by the electronic processing device) a measurement, at 610. The measurement may be acquired by performing a calculation utilizing two or more identified coordinates, pixels, and/or other points in the image(s)/data, for example. In some embodiments, a user may be prompted for the measurement and/or guided with respect to acquiring the measurement.

In some embodiments, once the measurement has been identified at 610 or in the case that no measurement is needed at 608, the method 600 may comprise determining (e.g., by the electronic processing device) whether the rule is met, at 612. The identified measurement (and/or other rule criteria data) may be compared to a stored threshold and/or reference value or range of values, for example, to determine whether the identified measurement (and/or other value) exceeds, equals, or falls below a mathematical value, range, and/or condition. In the case that an object classified as a television is determined to be larger than a certain stored dimensional threshold, for example, the threshold may be exceeded. In the case the rule specifies values over the threshold as being out of range or not meeting the rule, the rule may be determined to not be met. In some embodiments, the threshold and/or rule may not comprise binary decisions that are either met or not met, but may comprise ranges, cross-reference values, etc. The rule may identify different screen size bands for televisions, for example, and the determining regarding the rule being met (or not) may comprise determining which screen size band or range the particular television object falls within (e.g., based on the measurement). According to some embodiments, identifying which range is applicable may define a value attributable to the television based on the range. The ranges may comprise different estimated replacement values, for example, and each range may correspond to a particular value, rank, score, etc.

According to some embodiments, in the case that the rule is determined to not be met or satisfied, the method 600 may comprise recording (e.g., by the electronic processing device) a deviation, at 614. Binary rules may be evaluated, for example, as pass or fail, with failures being recorded and/or flagged. In some embodiments, deviations may comprise other identified relationships between object parameters and stored values or rules that are not binary. In the case of the television and the example different size ranges, for example, once it is determined which size range the television falls into, the rule may specify one or more ranges that comprise deviations (e.g., undesirable results) and in the case the given television falls within a deviant range, a deviation may be identified and/or recorded. According to some embodiments, deviations may be identified based on combinations of rules and/or decision tree results. An acceptable size (e.g., a first rule) television may not trigger a deviation for example, unless it is determined that it is also within a minimum distance (e.g., a second rule) from a heat or water source.

In some embodiments, once the deviation has been identified and/or recorded at 614 or in the case that the rule is determined to have been met or satisfied at 612, the method 600 may comprise calculating (e.g., by the electronic processing device) an assessment, at 616. The aggregate satisfaction and/or failure of an object with respect to applicable rules may, for example, be scored and/or otherwise assessed. In some embodiments, each rule may be associated with a point value and the sum, average, and/or other mathematical result based on a plurality of point values for one or more objects may be tallied, computed, and/or calculated. According to some embodiments, each identified and/or classified object may be evaluated and scored and the total score for all analyzed objects may be derived. The assessment, while mathematically and/or logically based, may comprise a numeric value or expression or another quantitative, qualitative, and/or combined metric and/or result.

In some embodiments, the method 600 may comprise determining (e.g., by the electronic processing device) whether there are more rules to evaluate, at 618. The method 600 may conduct a loop process for each object, for example, cycling through any or all identified rules that are relevant to the object. In the case that more rules are identified and/or have not yet been evaluated, the method 600 may revert back to and/or loop to identifying additional rules, at 606. In the case that all rules for an object have been evaluated and/or no more rules are otherwise identified, the method 600 may comprise determining (e.g., by the electronic processing device) whether there are more objects to evaluate, at 620. The method 600 may conduct a loop process for the analyzed location, image, and/or three-dimensional model, for example, cycling through any or all identified objects that have been identified. In the case that more objects are identified and/or have not yet been evaluated, the method 600 may revert back to and/or loop to identifying additional objects, at 602. In the case that all objects have been evaluated and/or no more objects are otherwise identified, the method 600 may comprise outputting (e.g., by the electronic processing device and/or via an electronic communications network) an indication of the assessment, at 622. An aggregated, summed, averaged, and/or otherwise overall assessment for a location may, for example, be transmitted to a user device, controller, and/or other device. According to some embodiments, the assessment may comprise one or more numbers, values, and/or qualitative determinations based on the data acquired from the underlying images/sensor data descriptive of the location. In such a manner, for example, a user may be provided with an AI-based assessment that dynamically evaluates the desired rule sets with respect to a location. In some embodiments, the assessment (or an indication thereof) may be output via one or more output devices and/or in one or more graphical formats, such as via a GUI generated and output by a display device.

IV. AI Three-Dimensional Modeling Interfaces

Figure 7:
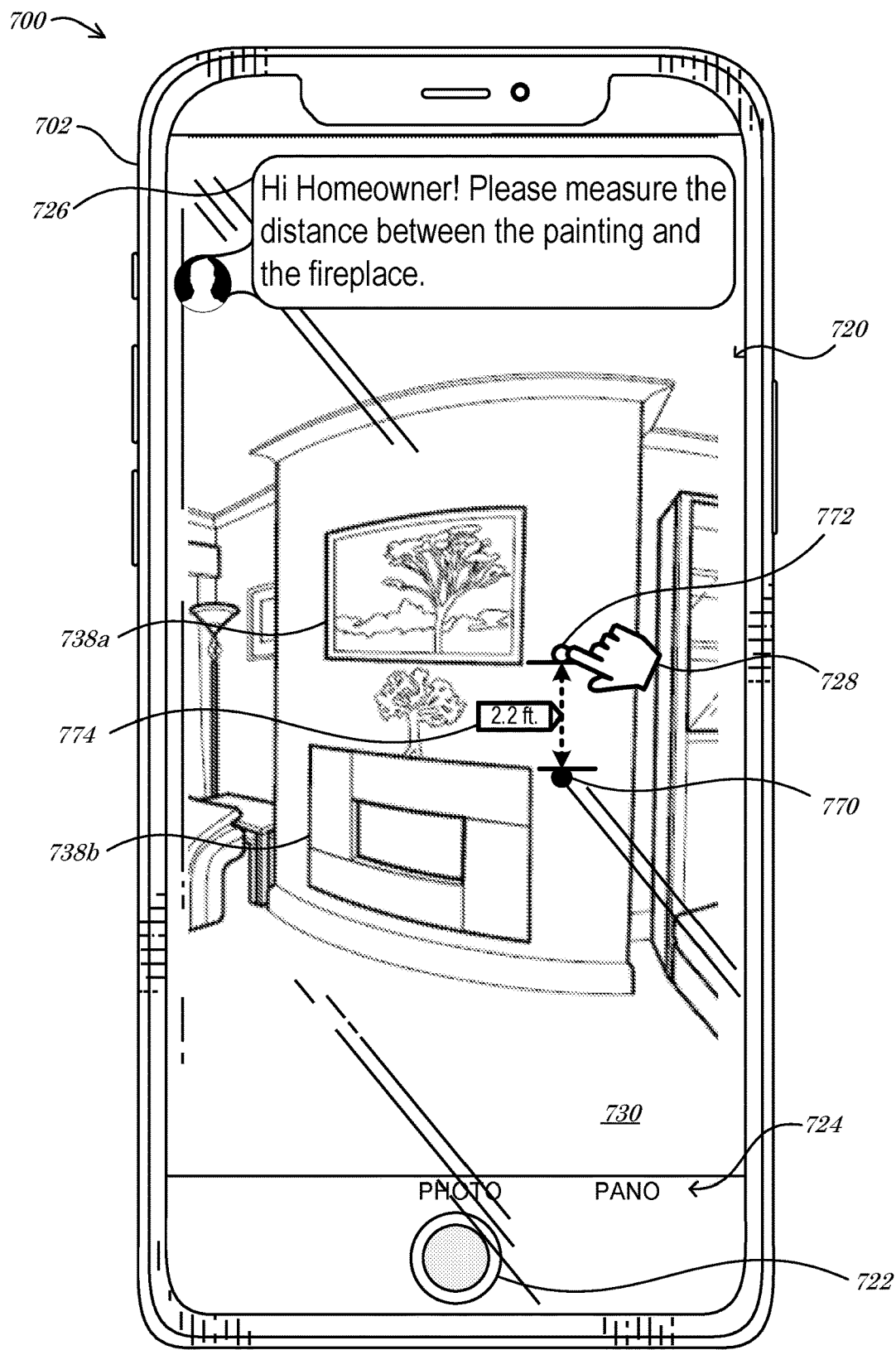
FIG. 7 is a diagram of a system providing an example interface according to some embodiments.

Referring now to FIG. 7, a diagram of a system 700 depicting a user device 702 providing an instance of an example interface 720 according to some embodiments is shown. In some embodiments, the interface 720 may comprise a web page, web form, database entry form, API, spreadsheet, table, and/or application or other GUI by which a user or other entity may enter data (e.g., provide or define input) to enable and/or trigger AI-based three-dimensional modeling and/or structural location assessments, as described herein. The interface 720 may, for example, comprise a front-end of an AI three-dimensional modeling and/or structural location assessment application program and/or platform programmed and/or otherwise configured to execute, conduct, and/or facilitate the methods 400, 600 of FIG. 4 and/or FIG. 6 herein, and/or portions or combinations thereof. In some embodiments, the interface 720 may be output via a computerized device, such as the user device 702, which may, for example, be similar in configuration to one or more of the user devices 102, 202*a-b* and/or the controller device/server 110, 210, of FIG. 1 and/or FIG. 2 herein.

According to some embodiments, the interface 720 may comprise one or more tabs and/or other segmented and/or logically-presented data forms and/or fields. In some embodiments, the interface 720 may be configured and/or organized to allow and/or facilitate entry and/or acquisition of information descriptive of a location for acquisition of a structural location assessment (e.g., via an AI three-dimensional modeling application). According to some embodiments, a first version (or page or instance) of the interface 720 as depicted in FIG. 7 may comprise an AR data acquisition and/or telepresence interface (e.g., defining a first input and/or output mechanism) by providing one or more data input and/or output mechanisms, tools, objects, and/or features, such as a data capture button 722, a data capture configuration menu 724, a telepresence chat window 726, a cursor or pointer 728 (e.g., in the shape of a pointing hand, as depicted), and/or an image display 730 (e.g., of a location). In some embodiments, the image display 730 may comprise and/or provide representations of a plurality of objects 738a-b, such as a first object or painting 738a and/or a second object or fireplace 738b.

In some embodiments, the first version (or page or instance) of the interface 720 may be utilized to initiate AI three-dimensional modeling (and/or initiation of a first program thereof). The interface 720 may, for example, be utilized to conduct a telepresence session between a user (not shown) of the user device 702 and a remote user (not shown). The telepresence chat window 726 may be utilized, for example, as a mechanism that permits the remote user to guide the local user (i.e., the user of the user device 702) through various tasks based on data captured by the user device 702. The remote user may direct the local user to capture one or more images based on imagery depicted in the image display 730, in some embodiments, such as to direct and/or guide the local user through capturing a panoramic photo, video, and/or a series of photos that are, together, descriptive of an entire room (or other structural location). In some embodiments, the output from the image display 730 may be made available (e.g., transmitted to) the remote user so that the remote user effectively sees the same output as the local user.

In some embodiments, the materials and/or surfaces of the objects 738a-b may be automatically determined and/or the user may be prompted to enter and/or confirm information descriptive of materials. Image analysis may compare textures, lines, patterns, and/or features of the objects 738a-b to stored textures, lines, patterns, and/or features, for example, to identify one or more materials. The uninterrupted and/or uniform surface texture of the fireplace 738b, for example, may be indicative of a smooth material such as marble, tile, or metal. In some embodiments, surface feature analysis may be supplemented with contextual pattern and/or object analysis rules and/or comparison data sets. The example fireplace 738b appears to be composed of four (4) rectangular blocks of material, based on apparent separation or joint lines therebetween, for example. Such shapes and/or computed shape dimensions may be cross-referenced with stored data descriptive of available and/or common material sizes to identify the material for the fireplace 738b as four (4) eight by twenty-four inch (8"×24") marble tiles. Different variations in color, texture, shading, patterns, lines, etc. may similarly be cross-referenced to automatically identify a likely (e.g., based on a ranked selection) material type for any or all objects 738a-b.

According to some embodiments, the telepresence chat window 726 may be utilized (as depicted in the example text in FIG. 7) to prompt the local user to acquire specific characteristic information descriptive of the location (and/or of data captured at the location). The telepresence chat window 726 may be utilized, for example, to prompt or instruct the local user (and/or the user device 702) to conduct a measurement derivation, such as an AR-based on-screen measurement. The local user may utilize the interface 720, for example, to measure distance and/or dimensions based on information output by the image display 730. According to some embodiments, the local user may utilize the pointer 728 to select, identify, and/or define a measurement starting location 770 on the image display 730 and/or a measurement ending location 772 on the image display 730. The local user may utilize an input device (not shown; a finger or stylus in the case that the interface 720 comprises a touchscreen display) to position the pointer 728 on the image display 730, for example, may click (or otherwise select) the starting location 770, and/or may drag the pointer 728 to the ending location 772 (and/or may click or otherwise select the ending location 772; e.g., with the pointer 728). In some embodiments, the interface 720 and/or the image display 730 may be updated to comprise and/or output a measurement 774, e.g., based on the selected locations/positions of the starting location 770 and the ending location 772. As depicted, for example, the measurement 774 between the painting 738a and the fireplace 738b may be calculated and/or computed to be two and two-tenths feet (2.2-ft.). In the case that the output of the image display 730 comprises embedded coordinate data, for example, the coordinates corresponding to the starting location 770 and the ending location 772 may be identified and mathematically compared to calculate a distance between the coordinates.

In some embodiments, the images, data, measurements, and/or other data captured, calculated, and/or computed by the user device 702 may be utilized (e.g., by an AI three-dimensional modeling and/or assessment program) to assess the location. The derived dimensions of the room, layout of the room, identified contents of the room, positions of contents within the room, derived materials of objects and/or surfaces of the room, features of the room, and/or distances between features, contents, objects, etc., may be compared, in some embodiments, to one or more stored rules to determine whether the one or more rules are met or satisfied. In the case that the fireplace 738b is identified at the location as depicted in the image display 730, for example, a rule for fireplaces may either be satisfied or violated (e.g., such as in the case that a fireplace is not permitted). According to some embodiments, a rule may define a criteria that any combustible items, such as the painting 738a, need to be at least two feet (2-ft.) away from any heat source (such as the fireplace 738b). In the example depicted in FIG. 7, since the measurement 774 of two and two-tenths feet (2.2-ft.) is greater than the stored threshold/criteria of two feet (2-ft.), the rule may be determined to be satisfied or met. According to some embodiments, such as in the case that it is determined that the painting 738a comprises a metal or wood material that is less combustible than cloth or canvas, for example, the rule may specify different distancing thresholds. In some embodiments, different materials themselves may correspond to different rules, such as a marble fireplace corresponding to a higher replacement value than a metal fireplace. According to some embodiments, the resolution of such rules may define one or more assessment parameters, such as ranks, scores, and/or other values.

Fewer or more components 702, 720, 722, 724, 726, 728, 730, 738a-b, 770, 772, 774 and/or various configurations of the depicted components 702, 720, 722, 724, 726, 728, 730, 738a-b, 770, 772, 774 may be included in the system 700 without deviating from the scope of embodiments described herein. In some embodiments, the components 702, 720, 722, 724, 726, 728, 730, 738a-b, 770, 772, 774 may be similar in configuration and/or functionality to similarly named and/or numbered components as described herein. In some embodiments, the system 700 (and/or portions thereof) may comprise an automatic AI three-dimensional modeling program, system, and/or platform programmed and/or otherwise configured to execute, conduct, and/or facilitate the methods/processes 400, 600 of FIG. 4 and/or FIG. 6 herein, and/or portions or combinations thereof.

While various components of the interface 720 have been depicted with respect to certain labels, layouts, headings, titles, and/or configurations, these features have been presented for reference and example only. Other labels, layouts, headings, titles, and/or configurations may be implemented without deviating from the scope of embodiments herein. Similarly, while a certain number of tabs, information screens, form fields, and/or data entry options have been presented, variations thereof may be practiced in accordance with some embodiments.

V. AI Three-Dimensional Modeling Apparatus and Articles of Manufacture

Figure 8:
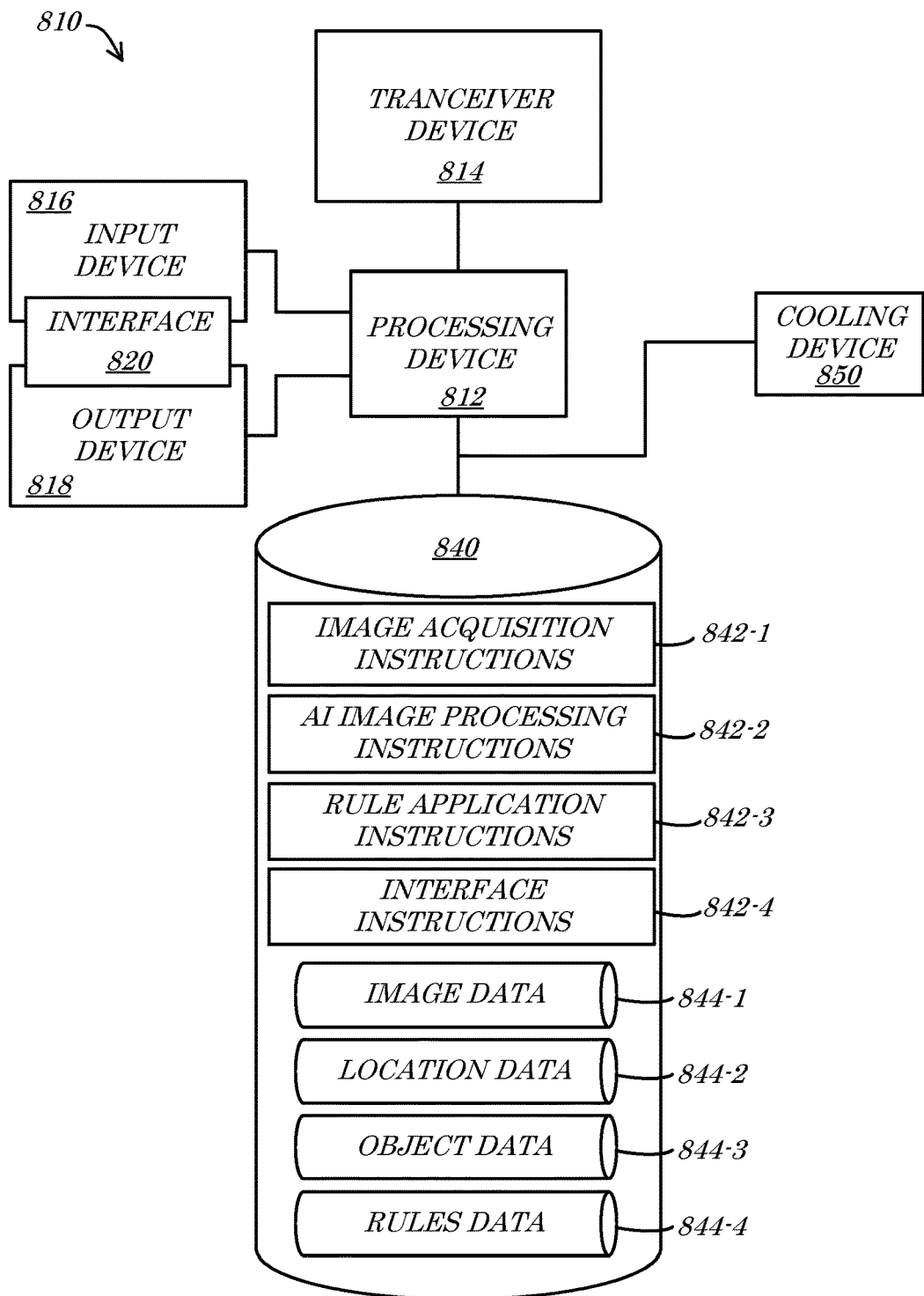
FIG. 8 is a block diagram of an apparatus according to some embodiments.
Figure 9A:
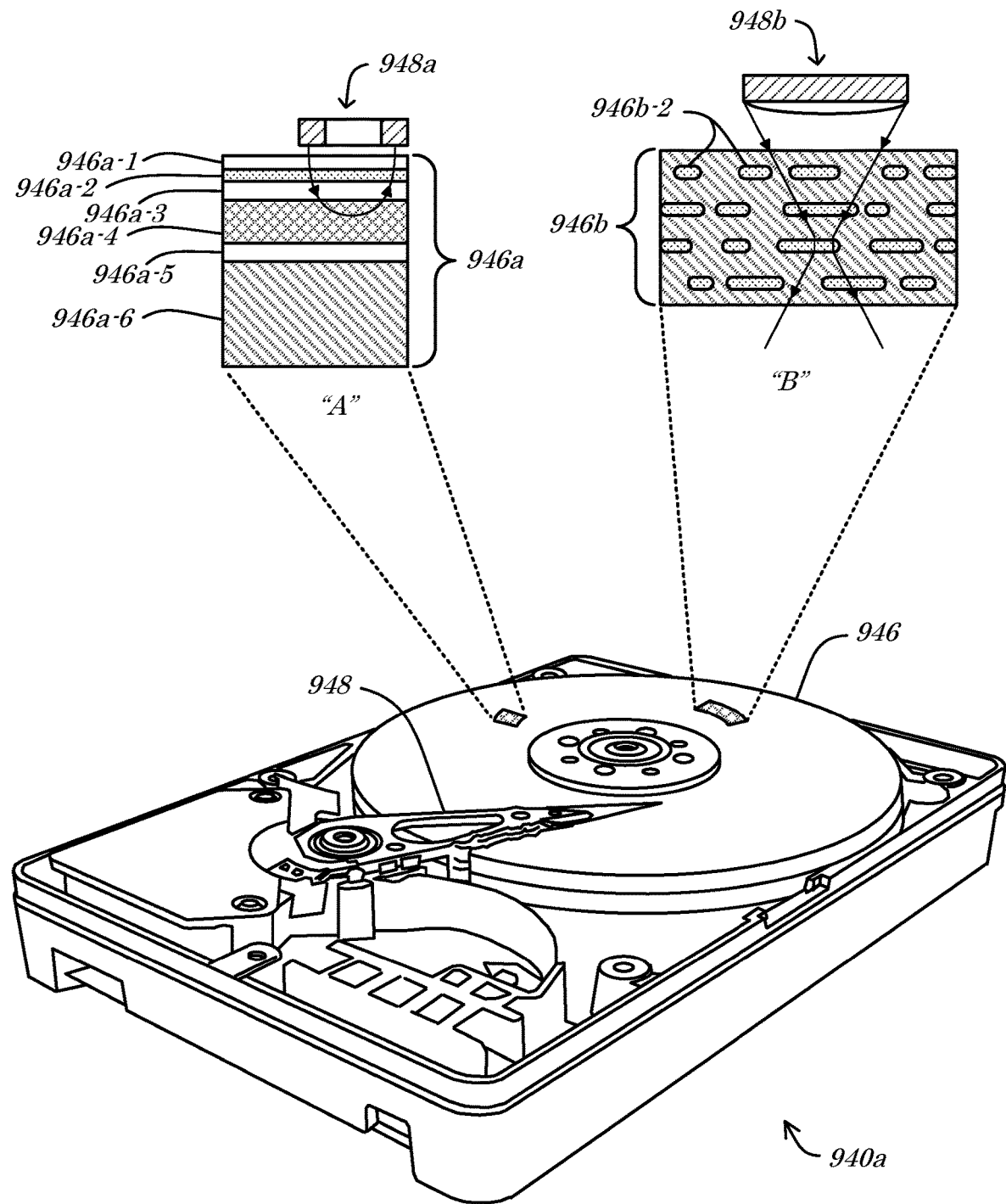
FIG. 9A, FIG. 9B, FIG. 9C, FIG. 9D, and FIG. 9E are perspective diagrams of exemplary data storage devices according to some embodiments.
Figure 9B:
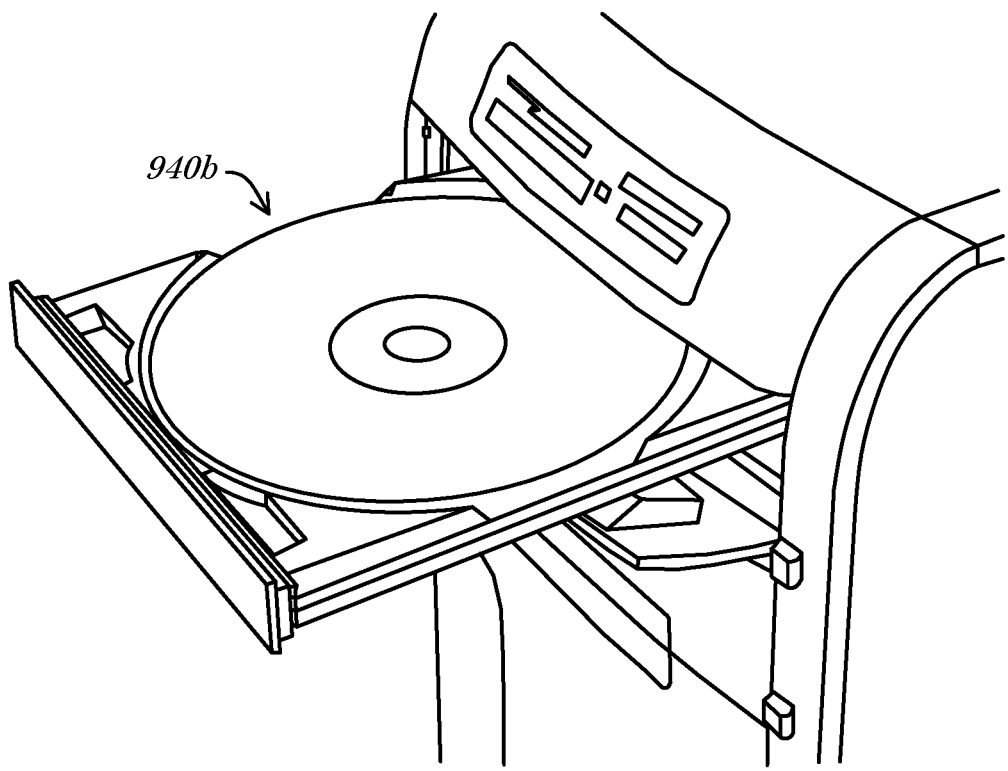
Figure 9C:
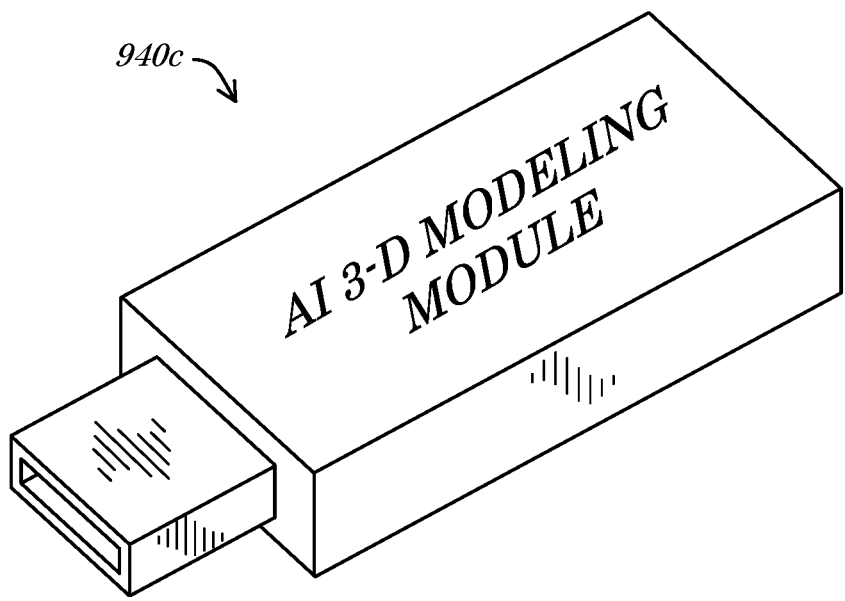
Figure 9D:
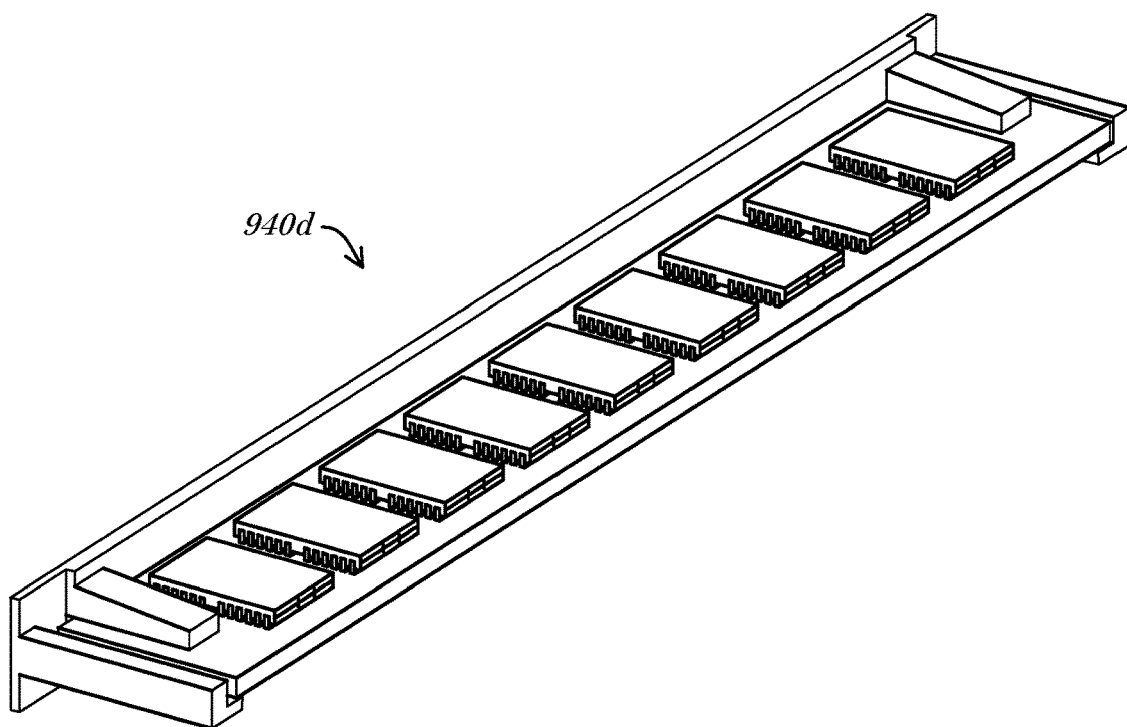
Figure 9E:
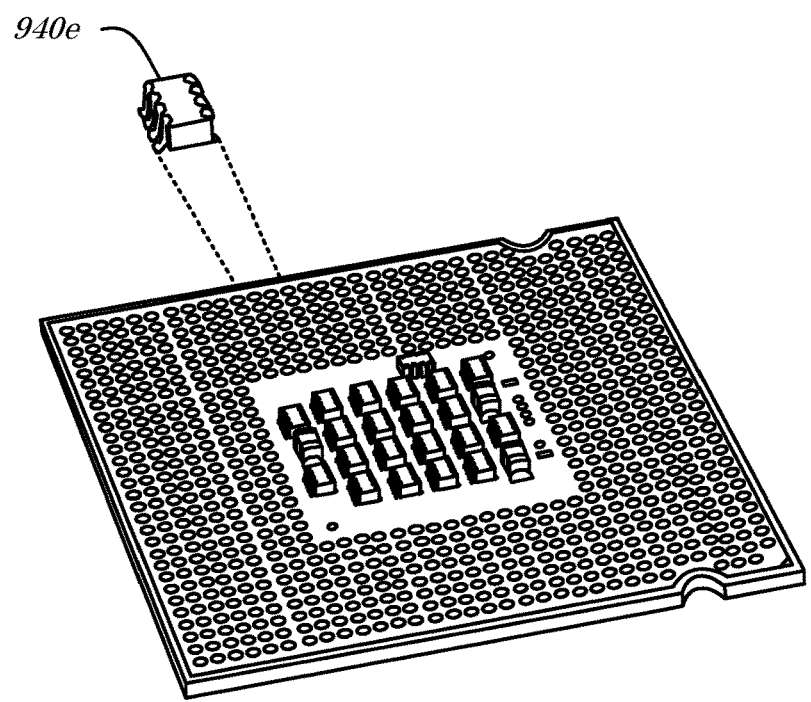

Turning to FIG. 8, a block diagram of an AI device or other apparatus 810 according to some embodiments is shown. In some embodiments, the apparatus 810 may be similar in configuration and/or functionality to any of the user devices 102, 202a-b, the imaging/camera devices 106, 206, and/or the controller device/server 110, 210, of FIG. 1 and/or FIG. 2 herein. The apparatus 810 may, for example, execute, process, facilitate, and/or otherwise be associated with the methods/processes 400, 600 of FIG. 4 and/or FIG. 6 herein, and/or portions or combinations thereof. In some embodiments, the apparatus 810 may comprise a processing device 812, a transceiver device 814, an input device 816, an output device 818, an interface 820, a memory device 840 (storing various programs and/or instructions 842 and data 844), and/or a cooling device 850. According to some embodiments, any or all of the components 812, 814, 816, 818, 820, 840, 842, 844, 850 of the apparatus 810 may be similar in configuration and/or functionality to any similarly named and/or numbered components described herein. Fewer or more components 812, 814, 816, 818, 820, 840, 842, 844, 850 and/or various configurations of the components 812, 814, 816, 818, 820, 840, 842, 844, 850 be included in the apparatus 810 without deviating from the scope of embodiments described herein.

According to some embodiments, the processor 812 may be or include any type, quantity, and/or configuration of processor that is or becomes known. The processor 812 may comprise, for example, an Intel® IXP 2800 network processor or an Intel® XEON™ Processor coupled with an Intel® E6501 chipset. In some embodiments, the processor 812 may comprise multiple interconnected processors, microprocessors, and/or micro-engines. According to some embodiments, the processor 812 (and/or the apparatus 810 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 810 comprises a server, such as a blade server, necessary power may be supplied via a standard AC outlet, power strip, surge protector, and/or Uninterruptible Power Supply (UPS) device.

In some embodiments, the transceiver device 814 may comprise any type or configuration of communication device that is or becomes known or practicable. The transceiver device 814 may, for example, comprise a Network Interface Card (NIC), a telephonic device, a cellular network device, a router, a hub, a modem, and/or a communications port or cable. According to some embodiments, the transceiver device 814 may also or alternatively be coupled to the processor 812. In some embodiments, the transceiver device 814 may comprise an IR, RF, Bluetooth™, Near-Field Communication (NFC), and/or Wi-Fi® network device coupled to facilitate communications between the processor 812 and another device (not shown).

According to some embodiments, the input device 816 and/or the output device 818 may be communicatively coupled to the processor 812 (e.g., via wired and/or wireless connections and/or pathways) and they may generally comprise any types or configurations of input and output components and/or devices that are or become known, respectively. The input device 816 may comprise, for example, a keyboard that allows an operator of the apparatus 810 to interface with the apparatus 810 (e.g., a user, such as to initiate and/or review AI-based structural location assessments, as described herein). The output device 818 may, according to some embodiments, comprise a display screen and/or other practicable output component and/or device. The output device 818 may, for example, provide an interface (such as the interface 820) via which AI three-dimensional modeling, assessment, and/or analysis data or information is provided to a user (e.g., via a website and/or mobile application). According to some embodiments, the input device 816 and/or the output device 818 may comprise and/or be embodied in a single device, such as a touch-screen monitor or display.

The memory device 840 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 840 may, according to some embodiments, store one or more of image acquisition instructions 842-1, AI image processing instructions 842-2, rule application instructions 842-3, and/or interface instructions 842-4, image data 844-1, location data 844-2, object data 844-3, and/or rules data 844-4. In some embodiments, the image acquisition instructions 842-1, AI image processing instructions 842-2, rule application instructions 842-3, and/or interface instructions 842-4, image data 844-1, location data 844-2, object data 844-3, and/or rules data 844-4 may be utilized by the processor 812 to provide output information via the output device 818 and/or the transceiver device 814.

According to some embodiments, the image acquisition instructions 842-1 may be operable to cause the processor 812 to process image data 844-1, location data 844-2, object data 844-3, and/or rules data 844-4 in accordance with embodiments as described herein. Image data 844-1, location data 844-2, object data 844-3, and/or rules data 844-4 received via the input device 816 and/or the transceiver device 814 may, for example, be analyzed, sorted, filtered, decoded, decompressed, ranked, scored, plotted, and/or otherwise processed by the processor 812 in accordance with the image acquisition instructions 842-1. In some embodiments, image data 844-1, location data 844-2, object data 844-3, and/or rules data 844-4 may be fed by the processor 812 through one or more mathematical and/or statistical formulas and/or models in accordance with the image acquisition instructions 842-1 to acquire and/or direct the acquisition of one or more images and/or other sensor data descriptive of a three hundred and sixty degree (360°) representation of a particular location (e.g., a room), as described herein.

In some embodiments, the AI image processing instructions 842-2 may be operable to cause the processor 812 to process image data 844-1, location data 844-2, object data 844-3, and/or rules data 844-4 in accordance with embodiments as described herein. Image data 844-1, location data 844-2, object data 844-3, and/or rules data 844-4 received via the input device 816 and/or the transceiver device 814 may, for example, be analyzed, sorted, filtered, decoded, decompressed, ranked, scored, plotted, and/or otherwise processed by the processor 812 in accordance with the AI image processing instructions 842-2. In some embodiments, image data 844-1, location data 844-2, object data 844-3, and/or rules data 844-4 may be fed by the processor 812 through one or more mathematical and/or statistical formulas and/or models in accordance with the AI image processing instructions 842-2 to process received images/data by identifying features and/or characteristics of the location as represented in the images/data and/or processing and projecting representations of such items into a three-dimensional model, as described herein.

According to some embodiments, the rule application instructions 842-3 may be operable to cause the processor 812 to process image data 844-1, location data 844-2, object data 844-3, and/or rules data 844-4 in accordance with embodiments as described herein. Image data 844-1, location data 844-2, object data 844-3, and/or rules data 844-4 received via the input device 816 and/or the transceiver device 814 may, for example, be analyzed, sorted, filtered, decoded, decompressed, ranked, scored, plotted, and/or otherwise processed by the processor 812 in accordance with the rule application instructions 842-3. In some embodiments, image data 844-1, location data 844-2, object data 844-3, and/or rules data 844-4 may be fed by the processor 812 through one or more mathematical and/or statistical formulas and/or models in accordance with the rule application instructions 842-3 to conduct an AI-based analysis and/or assessment (utilizing one or more AI programs and/or rule sets) of a structural location by scoring, ranking, and/or assessing features and/or characteristics of the location (e.g., as represented in the three-dimensional model), as described herein.

In some embodiments, the interface instructions 842-4 may be operable to cause the processor 812 to process image data 844-1, location data 844-2, object data 844-3, and/or rules data 844-4 in accordance with embodiments as described herein. Image data 844-1, location data 844-2, object data 844-3, and/or rules data 844-4 received via the input device 816 and/or the transceiver device 814 may, for example, be analyzed, sorted, filtered, decoded, decompressed, ranked, scored, plotted, and/or otherwise processed by the processor 812 in accordance with the interface instructions 842-4. In some embodiments, image data 844-1, location data 844-2, object data 844-3, and/or rules data 844-4 may be fed by the processor 812 through one or more mathematical and/or statistical formulas and/or models in accordance with the interface instructions 842-4 to provide various interfaces to end-users, consumers, companies, and/or other users to facilitate structural location assessment utilizing a three-dimensional model of the location, as described herein.

According to some embodiments, the apparatus 810 may comprise the cooling device 850. According to some embodiments, the cooling device 850 may be coupled (physically, thermally, and/or electrically) to the processor 812 and/or to the memory device 840. The cooling device 850 may, for example, comprise a fan, heat sink, heat pipe, radiator, cold plate, and/or other cooling component or device or combinations thereof, configured to remove heat from portions or components of the apparatus 810.

Any or all of the exemplary instructions and data types described herein and other practicable types of data may be stored in any number, type, and/or configuration of memory devices that is or becomes known. The memory device 840 may, for example, comprise one or more data tables or files, databases, table spaces, registers, and/or other storage structures. In some embodiments, multiple databases and/or storage structures (and/or multiple memory devices 840) may be utilized to store information associated with the apparatus 810. According to some embodiments, the memory device 840 may be incorporated into and/or otherwise coupled to the apparatus 810 (e.g., as shown) or may simply be accessible to the apparatus 810 (e.g., externally located and/or situated).

Referring now to FIG. 9A, FIG. 9B, FIG. 9C, FIG. 9D, and FIG. 9E, perspective diagrams of exemplary data storage devices 940*a-e* according to some embodiments are shown. The data storage devices 940*a-e* may, for example, be utilized to store instructions and/or data, such as the image acquisition instructions 842-1, AI image processing instructions 842-2, rule application instructions 842-3, and/or interface instructions 842-4, image data 844-1, location data 844-2, object data 844-3, and/or rules data 844-4, each of which is presented in reference to FIG. 8 herein. In some embodiments, instructions stored on the data storage devices 940*a-e* may, when executed by a processor, cause the implementation of and/or facilitate the methods/processes 400, 600 of FIG. 4 and/or FIG. 6 herein, and/or portions or combinations thereof.

According to some embodiments, the first data storage device 940*a* may comprise one or more various types of internal and/or external hard drives. The first data storage device 940*a* may, for example, comprise a data storage medium 946 that is read, interrogated, and/or otherwise communicatively coupled to and/or via a disk reading device 948. In some embodiments, the first data storage device 940*a* and/or the data storage medium 946 may be configured to store information utilizing one or more magnetic, inductive, and/or optical means (e.g., magnetic, inductive, and/or optical-encoding). The data storage medium 946, depicted as a first data storage medium 946*a* for example (e.g., breakout cross-section "A"), may comprise one or more of a polymer layer 946*a*-1, a magnetic data storage layer 946*a*-2, a non-magnetic layer 946*a*-3, a magnetic base layer 946*a*-4, a contact layer 946*a*-5, and/or a substrate layer 946*a*-6. According to some embodiments, a magnetic read head 948*a* may be coupled and/or disposed to read data from the magnetic data storage layer 946*a*-2.

In some embodiments, the data storage medium 946, depicted as a second data storage medium 946*b* for example (e.g., breakout cross-section "B"), may comprise a plurality of data points 946*b*-2 disposed with the second data storage medium 946*b*. The data points 946*b*-2 may, in some embodiments, be read and/or otherwise interfaced with via a laser-enabled read head 948*b* disposed and/or coupled to direct a laser beam through the second data storage medium 946*b*.

In some embodiments, the second data storage device 940*b* may comprise a CD, CD-ROM, DVD, Blu-Ray™ Disc, and/or other type of optically-encoded disk and/or other storage medium that is or becomes known or practicable. In some embodiments, the third data storage device 940*c* may comprise a USB keyfob, dongle, and/or other type of flash memory data storage device that is or becomes known or practicable. In some embodiments, the fourth data storage device 940*d* may comprise RAM of any type, quantity, and/or configuration that is or becomes practicable and/or desirable. In some embodiments, the fourth data storage device 940*d* may comprise an off-chip cache, such as a Level 2 (L2) cache memory device. According to some embodiments, the fifth data storage device 940*e* may comprise an on-chip memory device, such as a Level 1 (L1) cache memory device.

The data storage devices 940*a-e* may generally store program instructions, code, and/or modules that, when executed by a processing device cause a particular machine to function in accordance with one or more embodiments described herein. The data storage devices 940*a-e* depicted in FIG. 9A, FIG. 9B, FIG. 9C, FIG. 9D, and FIG. 9E are representative of a class and/or subset of computer-readable media that are defined herein as "computer-readable memory" (e.g., non-transitory memory devices as opposed to transmission devices or media).

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like. The term "computing" as utilized herein may generally refer to any number, sequence, and/or type of electronic processing activities performed by an electronic device, such as, but not limited to looking up (e.g., accessing a lookup table or array), calculating (e.g., utilizing multiple numeric values in accordance with a mathematic formula), deriving, and/or defining.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™ TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. An Artificial Intelligence (AI) three-dimensional modeling system, comprising:
   an electronic processing device; and
   a non-transitory computer readable memory device in communication with the electronic processing device, the non-transitory computer readable memory device storing AI three-dimensional analysis instructions that, when executed by the electronic processing device, result in:
   receiving, by the electronic processing device, at least one image descriptive of a room as viewed from a plurality of perspectives;
   identifying, by the electronic processing device and from the at least one image, a plurality of corners of the room that are represented at a plurality of respective corner portions of the at least one image;
   identifying, by the electronic processing device and based on the identified plurality of corners of the room, at least one camera location within the room;
   identifying, by the electronic processing device and based on the identified plurality of corners of the room and the identified at least one camera location within the room, a plurality of walls of the room that are represented by a plurality of respective wall portions of the at least one image;
   segmenting, by the electronic processing device and based on the identified plurality of walls of the room, the image into the plurality of respective wall portions of the at least one image;
   normalizing, by the electronic processing device, the plurality of respective wall portions of the at least one image;
   defining, by the electronic processing device, an array of coordinates for each of the plurality of respective wall portions of the at least one image;
   projecting, by the electronic processing device and utilizing the array of coordinates for each of the plurality of respective wall portions of the at least one image, the plurality of respective wall portions of the at least one image into a three-dimensional model;
   identifying, by the electronic processing device, an object within the at least one image;
   classifying, by the electronic processing device, the object, thereby defining a classification of the object;
   identifying, by the electronic processing device and based on the classifying of the object, a rule for the object, wherein the identifying comprises querying, utilizing data descriptive of the classification of the object, a plurality of stored rules and identifying, from the plurality of stored rules, the rule for the object;
   calculating, by the electronic processing device and based on the rule, an assessment for the room; and
   outputting, by the electronic processing device, an indication of the assessment.

2. The AI three-dimensional modeling system of claim 1, wherein the at least one image descriptive of the room as viewed from the plurality of perspectives comprises a series of images captured from different perspectives in the room.

3. The AI three-dimensional modeling system of claim 1, wherein the at least one image descriptive of the room as viewed from the plurality of perspectives comprises a panoramic image of the room.

4. The AI three-dimensional modeling system of claim 1, wherein the identifying of the at least one camera location within the room comprises calculating the at least one camera location utilizing a parallax angle.

5. The AI three-dimensional modeling system of claim 1, wherein the plurality of corners of the room comprise at least four corners.

6. The AI three-dimensional modeling system of claim 1, wherein the plurality of walls of the room comprise at least four walls.

7. The AI three-dimensional modeling system of claim 1, wherein the normalizing of the plurality of respective wall portions of the at least one image comprises transforming, for each respective wall portion, a plurality of coordinates of the array of coordinates from a first location to a second location bounded within a rectilinear frame.

8. The AI three-dimensional modeling system of claim 1, wherein the object comprises a doorway, and wherein the classifying of the object comprises matching at least one feature of the doorway to at least one of a stored set of features for doorways.

9. The AI three-dimensional modeling system of claim 8, wherein the rule for the object comprises a mapping of an area of the doorway to a value for an assessment metric, and wherein the calculating of the assessment for the room comprises:
   measuring, from the at least one image and based on a subset of the array of coordinates descriptive of a position of the doorway, the area of the doorway; and
   computing, based on the rule and the measured area of the doorway, the value for the assessment metric.

10. The AI three-dimensional modeling system of claim 1, wherein the object comprises a window, and wherein the classifying of the object comprises matching at least one feature of the window to a at least one of a stored set of features for windows.

11. The AI three-dimensional modeling system of claim 10, wherein the rule for the object comprises a mapping of an area of the window to a value for an assessment metric, and wherein the calculating of the assessment for the room comprises:
   measuring, from the at least one image and based on a subset of the array of coordinates descriptive of a position of the window, the area of the window; and
   computing, based on the rule and the measured area of the window, the value for the assessment metric.

12. The AI three-dimensional modeling system of claim 1, wherein the object comprises a first object and comprises a furnishing of the room, and wherein the rule for the object comprises a first rule, and wherein the AI three-dimensional analysis instructions, when executed by the electronic processing device, further result in:
   identifying, by the electronic processing device, a second object within the at least one image, wherein the second object comprises a furnishing of the room;
   classifying, by the electronic processing device, the second object; and
   identifying, by the electronic processing device and based on the classifying of the second object, a second rule for the second object.

13. The AI three-dimensional modeling system of claim 12, wherein the calculating of the assessment for the room is further based on the second rule.

14. The AI three-dimensional modeling system of claim 13, wherein the first rule for the first object comprises a first formula that defines a first value for a first assessment metric based on a first attribute of the first object, wherein the second rule for the second object comprises a second formula that defines a second value for a second assessment metric based on a second attribute of the second object, and wherein the calculating of the assessment for the room comprises at least one of: (i) adding the first and second values, (ii) subtracting the first and second values, and (iii) averaging the first and second values.

15. The AI three-dimensional modeling system of claim 1, further comprising:
   initiating a communication session with a user of a mobile electronic device;
   receiving real-time imagery from an image device of the mobile electronic device; and
   transmitting, to the mobile electronic device, an instruction defining how the user should acquire the at least one image descriptive of the room.

16. The AI three-dimensional modeling system of claim 15, wherein the instruction defines at least one of the perspectives from the plurality of perspectives.

17. The AI three-dimensional modeling system of claim 13, wherein the first rule comprises a rule based on at least one of a quantity, brand, and condition of the first object and wherein the second rule comprises a rule based on at least one of a quantity, brand, and condition of the second object.

18. The AI three-dimensional modeling system of claim 13, wherein at least one of the first rule and the second rule comprises a condition defining a minimum distance threshold between the first object and the second object and wherein the assessment comprises a score that is reduced in a case where a distance between the first object and the second object fails to meet the condition.

19. The AI three-dimensional modeling system of claim 1, wherein the object comprises a plurality of different objects, the rule comprises a different rule for each object of the plurality of objects, and wherein the calculating of the assessment, comprises:
   evaluating, for each different rule, whether a condition of the rule is met;
   computing, based on the evaluation and for each different rule, a number of points; and
   summing the number of points for all the rules, thereby defining a total number of points for the assessment.

20. The AI three-dimensional modeling system of claim 19, wherein at least one object of the plurality of objects comprise a furnishing of the room.

* * * * *